(12) United States Patent
Vasagar

(10) Patent No.: US 11,635,146 B2
(45) Date of Patent: Apr. 25, 2023

(54) CIRCUMFERENTIAL SEALING ASSEMBLY WITH DUCT-FED HYDRODYNAMIC GROOVES

(71) Applicant: Stein Seal Company, Kulpsville, PA (US)

(72) Inventor: Thurai Manik Vasagar, Hatfield, PA (US)

(73) Assignee: Stein Seal Company, Kulpsville, PA (US)

( * ) Notice: Subject to any disclaimer, the term of this patent is extended or adjusted under 35 U.S.C. 154(b) by 0 days.

(21) Appl. No.: 17/386,045

(22) Filed: Jul. 27, 2021

(65) Prior Publication Data

US 2023/0029826 A1 Feb. 2, 2023

(51) Int. Cl.
*F16J 15/34* (2006.01)

(52) U.S. Cl.
CPC ................................ *F16J 15/3412* (2013.01)

(58) Field of Classification Search
CPC .... F16J 15/00; F16J 15/16; F16J 15/50; F16J 15/52; F16J 15/34; F16J 15/3404; F16J 15/3408; F16J 15/3412; F16J 15/3416; F16J 15/342; F16J 15/3424; F16J 15/162; F16J 15/40; F16J 15/3464; F16J 15/3244; F16J 15/3248
USPC ........................................................ 277/400
See application file for complete search history.

(56) References Cited

U.S. PATENT DOCUMENTS

| | | | |
|---|---|---|---|
| 3,804,424 A | 4/1974 | Gardner | |
| 4,230,324 A | 10/1980 | Derman | |
| 4,447,063 A | 5/1984 | Kotzur et al. | |
| 5,193,974 A | * 3/1993 | Hufford | ............... F04D 1/12 415/111 |
| 5,558,341 A | 9/1996 | McNickle et al. | |

(Continued)

FOREIGN PATENT DOCUMENTS

| | | |
|---|---|---|
| GB | 848854 | 9/1960 |
| WO | 2004053365 A1 | 6/2004 |

*Primary Examiner* — Nathan Cumar
(74) *Attorney, Agent, or Firm* — Michael Crilly, Esq.

(57) ABSTRACT

A circumferential sealing assembly for use between a lower-pressure side with a lubricant oil therein and a higher-pressure side with a hot gas therein is presented. The assembly includes a sealing ring interposed between either a rotatable runner and a housing or a sleeve and a housing within a turbine engine. Ducts communicate the hot gas into grooves to form a thin film between the ring and the runner or the ring and the sleeve. First embodiments include grooves on the runner, ducts through the runner, and both grooves and ducts rotating with the runner. Second embodiments include grooves on the ring, ducts through the runner, and ducts rotating with the runner. Third embodiments include grooves on the ring and ducts through the ring adjacent to a runner. Fourth embodiments include grooves on the runner, ducts through the ring, and grooves rotating with the runner. Fifth embodiments include grooves on the sleeve, ducts through the sleeve, and both grooves and ducts rotating with the sleeve. Sixth embodiments include grooves on the ring, ducts through the sleeve, and ducts rotating with the sleeve. Seventh embodiments include grooves on the ring and ducts through the ring adjacent to a sleeve. Eighth embodiments include grooves on the sleeve, ducts through the ring, and grooves rotating with the sleeve.

25 Claims, 20 Drawing Sheets

(56) References Cited

U.S. PATENT DOCUMENTS

| | | | | |
|---|---|---|---|---|
| 6,135,458 | A | * | 10/2000 | Fuse .................. F16J 15/342 |
| | | | | 277/400 |
| 6,338,490 | B1 | | 1/2002 | Bainachi |
| 6,494,460 | B2 | | 12/2002 | Uth |
| 6,505,836 | B1 | | 1/2003 | Toshihiko |
| 7,744,094 | B2 | | 6/2010 | Yanagisawa et al. |
| 7,862,046 | B2 | | 1/2011 | Lederer et al. |
| 9,394,799 | B1 | * | 7/2016 | Mills .................. F16J 15/34 |
| 9,714,712 | B2 | | 7/2017 | Kiernan |
| 2018/0045316 | A1 | * | 2/2018 | Kovacik ............ F01D 25/22 |
| 2019/0017547 | A1 | * | 1/2019 | Garrison ............ F16J 15/442 |
| 2020/0158175 | A1 | * | 5/2020 | Garrison ........... F16C 32/0625 |

\* cited by examiner

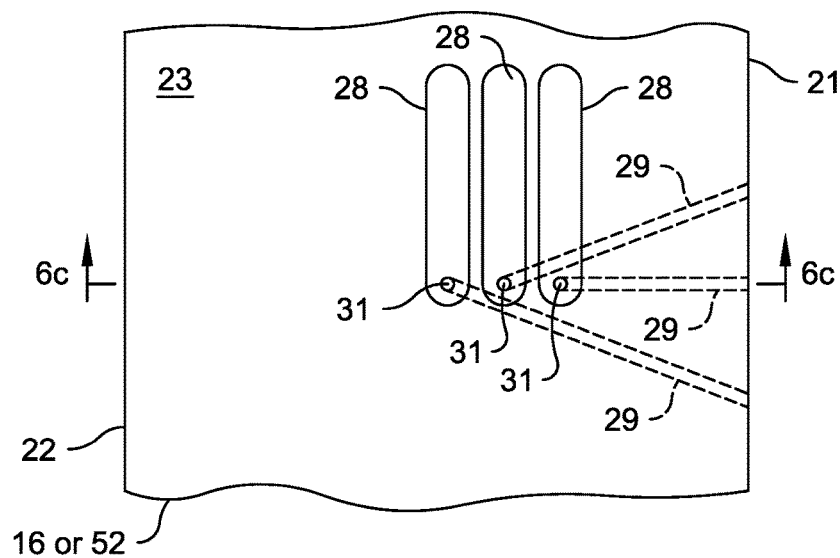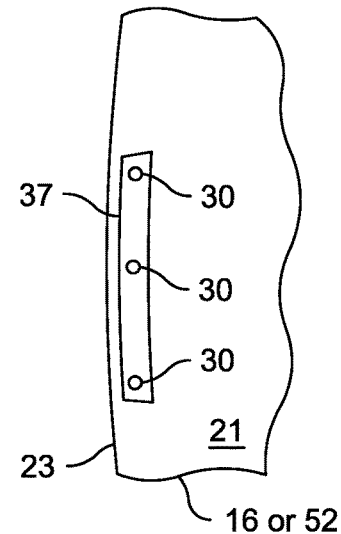
Fig. 6a  Fig. 6b
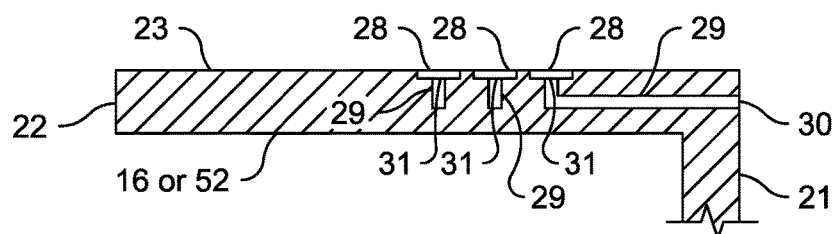
Fig. 6c

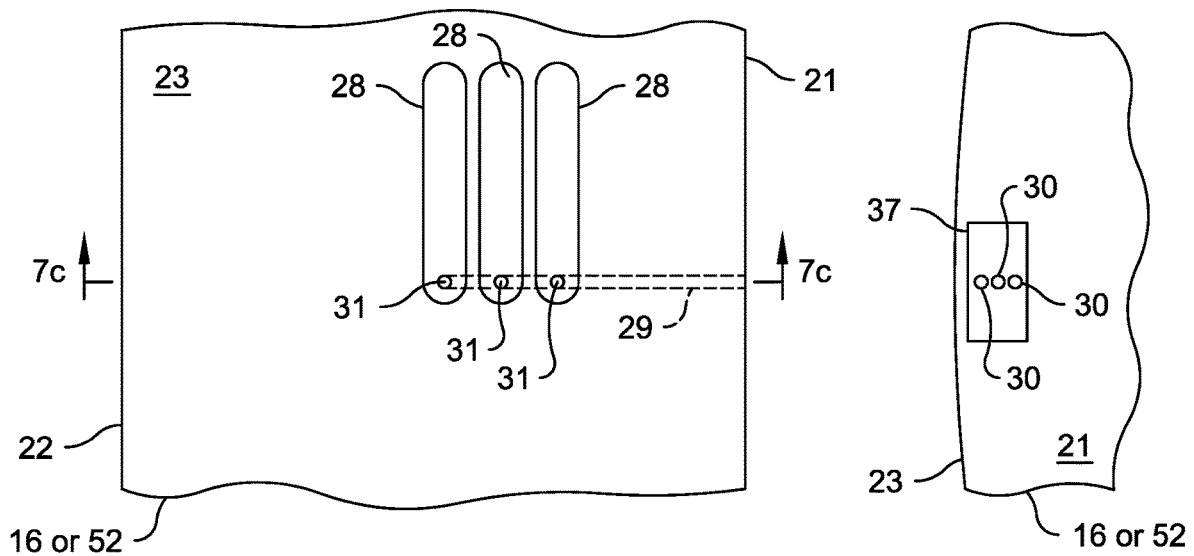
*Fig. 7a*      *Fig. 7b*
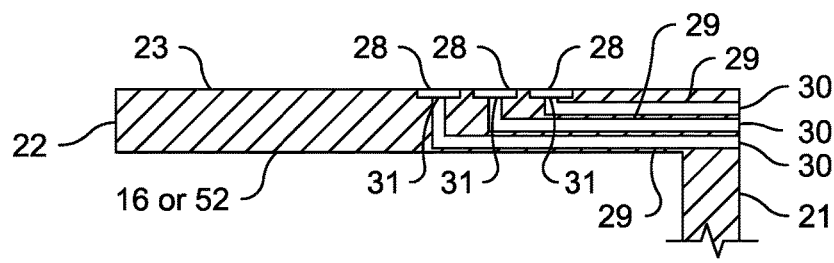
*Fig. 7c*

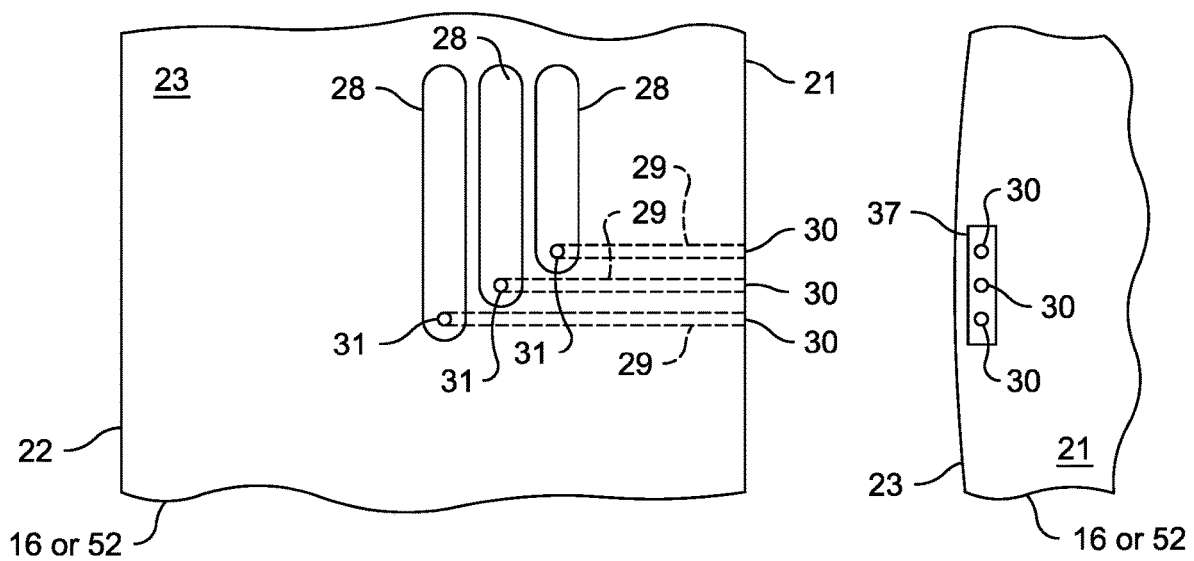
*Fig. 8a*  *Fig. 8b*

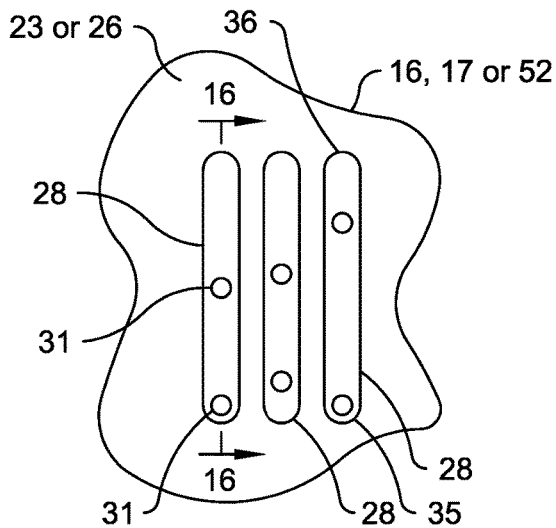
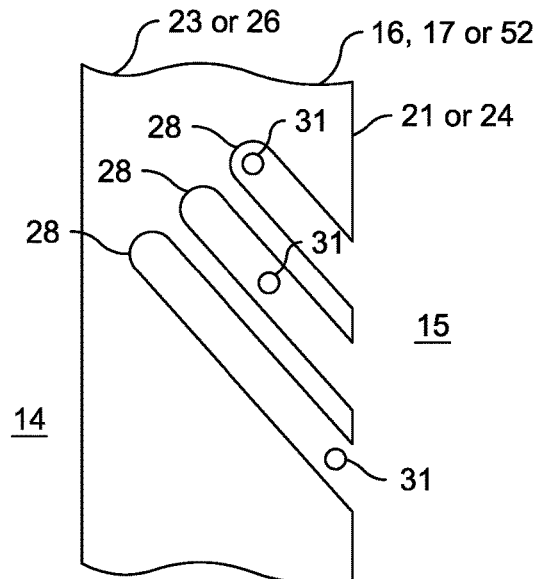
*Fig. 15*  *Fig. 17*
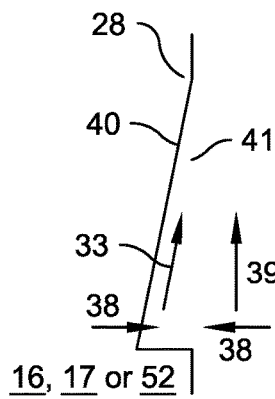 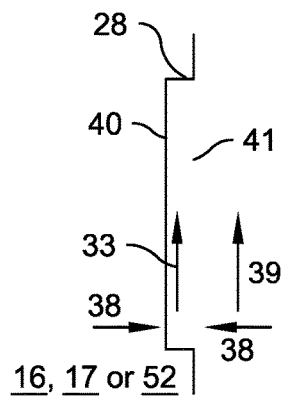 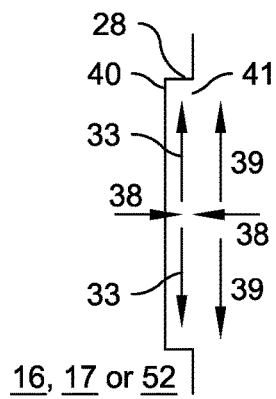 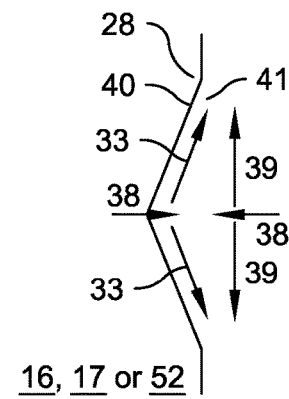
*Fig. 16a*  *Fig. 16b*  *Fig. 16c*  *Fig. 16d*

CIRCUMFERENTIAL SEALING ASSEMBLY WITH DUCT-FED HYDRODYNAMIC GROOVES

CROSS REFERENCE TO RELATED APPLICATIONS

None.

GOVERNMENT SPONSORED RESEARCH AND DEVELOPMENT

None.

BACKGROUND

1. Field

The disclosure generally relates to sealing and more particularly is concerned, for example, with circumferential-type sealing between a sealing ring and either a rotatable runner or a sleeve for separating one compartment with a lubricant oil therein from another compartment with a hot gas therein wherein the sealing ring and the rotatable runner are adapted to maintain circumferentially-disposed sealing so as to minimize mixing between the oil and the gas.

2. Background

There are many applications wherein a housing is provided with a plurality of interior sections having a rotating part passing therethrough, wherein one of the interior sections must be isolated from another by means of a seal. In gas turbine applications, for example, it is critical that lubricant, typically oil, contained within a lubricant section of the housing be sealed from a fluid, typically hot air, within a gas section of the housing. This is especially true along a rotatable runner which passes from the lubricant side of a seal to the gas side of the same seal. In one specific example, the seal may be a sump seal within an aircraft engine which separates a higher-pressure side, typically the gas side, from a lower-pressure side, typically the lubricant side. The sump seal serves two primary functions, namely, it prevents migration of oil from a lower-pressure compartment to a higher-pressure compartment and it minimizes the flow rate of hot gas from a higher-pressure compartment to an oil-wetted, lower-pressure compartment.

Leakage across a sump seal is known to adversely affect performance of the equipment wherein the seal is used. In the case of an aircraft engine, oil that enters the hot-air side or hot air that enters the oil side may cause oil coking and/or an engine fire. Oil coke is a byproduct when oil is heated to an elevated temperature which chemically alters the oil. Oil coke is detrimental to a gas turbine because it often fouls the sealing surfaces thereby reducing the integrity of the seal and frustrating proper bearing lubrication. Also, oil coke and oil may under certain elevated temperature and pressure conditions combust thereby damaging an aircraft engine in part or whole. Therefore, it is important in similar applications, not just the aircraft engine, that a lubricant be isolated within a lubricant sump and that a seal around a rotating runner not allow the lubricant to escape the sump.

Seals for such applications include either circumferential-type seals or face-type seals; however, circumferential seals are more common. Several examples of circumferential sealing are described by Vasagar et al. in U.S. Pat. No. 8,342,534 entitled *Low and Reverse Pressure Application Hydrodynamic Pressurizing Seals*. This reference describes improvements, such as illustrated by way of example in FIGS. 1*a* and 1*b*, to a sealing assembly 1 wherein a rotatable runner 2, a sealing ring 3 disposed about the rotatable runner 2, and a housing 4 disposed about the sealing ring 3 are interposed between a lower-pressure side 5 (the oil side) and a higher-pressure side 6 (the gas side). The rotatable runner 2 extends from and rotates with a shaft, about a centerline 42, in close proximity to another element, such as the sealing ring 3, so that a seal is formed between the rotatable runner 2 and the other element. The sealing ring 3 further comprises two or more carbon and/or graphite segments arranged circumferentially around the rotatable runner 2 to form a continuous, relatively stationary ring-shaped structure. The abutting ends of adjacent segments may overlap so as to restrict leakage therebetween.

Referring now to FIGS. 1*b* and 1*c*, improved sealing is often achieved by grooves 7 along an inner surface 8 of the sealing ring 3 at the overlap with an outer surface 9 of the rotatable runner 2. The grooves 7 cannot be completely covered by the sealing ring 3 so that air enters each groove 7 from the higher-pressure side 6. The inflow 10 directs air from the higher-pressure side 6 into and along each groove 7 after which the air is redirected by the grooves 7 to form a thin film 11 between the inner surface 8 and the outer surface 9. The thin film 11 prevents oil at the lower-pressure side 5 from entering the higher-pressure side 6 and maintains separation between the rotatable runner 2 and the sealing ring 3 to avoid excessive wear along the overlapping surfaces 8, 9.

Improved sealing via grooves 7, however, is particularly challenging because flow conditions along the grooves 7 may not always favor inflow 10. When this occurs, a portion of the air within a groove 7 may under some conditions result in a backflow 12, such as illustrated in FIG. 1*c*, whereby flow conditions allow the air to reenter the higher-pressure side 6. Backflow 12 reduces the quantity of air available to properly maintain sealing thereby increasing the likelihood of mixing between lubricant oil and hot gas which in turn increases the risks of oil coking and an engine fire. Therefore, groove-fed sealing remains a less than optimal solution in some applications.

Accordingly, what is required is a circumferential sealing assembly which avoids the backflow along grooves by a gas required for sealing between a rotatable runner and a sealing ring to prevent mixing between the gas and an oil lubricant so as to minimize the likelihood of oil coking or an engine fire.

SUMMARY

An object of the disclosure is a circumferential sealing assembly which avoids the backflow along grooves by a gas required for sealing between a rotatable runner and a sealing ring to prevent mixing between the gas and an oil lubricant so as to minimize the likelihood of oil coking or an engine fire.

In accordance with first embodiments, the circumferential sealing assembly includes a rotatable runner, a sealing ring disposed about the rotatable runner, and a housing disposed about the sealing ring. The rotatable runner comprises an outer sealing surface interposed between a higher-pressure end and a lower-pressure end. The sealing ring comprises an inner sealing surface interposed between a higher-pressure face and a lower-pressure face. A plurality of grooves are disposed along the outer sealing surface. A plurality of ducts communicate with the grooves. Each duct passes through the rotatable runner from an inlet at the higher-pressure end to an outlet at the groove. The grooves and the ducts rotate with the rotatable runner. The ducts in use receive the hot gas at the higher-pressure end via the inlets and direct the hot gas into the grooves via the outlets. The hot gas entering the grooves in use via the ducts in combination with rotation of the grooves with the rotatable runner cause the hot gas to form a hydrodynamic flow within the grooves. The grooves redirect the hot gas in the direction of the inner sealing surface to form a thin film between the outer sealing surface and the inner sealing surface. The thin film resists migration of the lubricant from the lower-pressure side to the higher-pressure side. The grooves and the ducts avoid backflow of the hot gas to prevent migration of the lubricant to the higher-pressure side.

In accordance with second embodiments, the circumferential sealing assembly includes a rotatable runner, a sealing ring disposed about the rotatable runner, and a housing disposed about the sealing ring. The rotatable runner comprises an outer sealing surface interposed between a higher-pressure end and a lower-pressure end. The sealing ring comprises an inner sealing surface interposed between a higher-pressure face and a lower-pressure face. A plurality of grooves are disposed along the inner sealing surface. A plurality of ducts are arranged so that each duct separately passes through the rotatable runner from an inlet at the higher-pressure end to an outlet at the outer sealing surface. The ducts rotate with the rotatable runner. The ducts in use receive the hot gas at the higher-pressure end via the inlets and direct the hot gas toward the inner sealing surface via the outlets. The hot gas sweepingly impinges the grooves as the outlets rotate with the rotatable runner thereby causing a hydrodynamic flow by the hot gas within each hydrodynamic groove. The grooves redirect the hot gas in direction of the outer sealing surface to form a thin film between the outer sealing surface and the inner sealing surface. The thin film resists migration of the lubricant from the lower-pressure side to the higher-pressure side. The grooves and the ducts avoid backflow of the hot gas to prevent migration of the lubricant to the higher-pressure side.

In accordance with third embodiments, the circumferential sealing assembly includes a rotatable runner, a sealing ring disposed about the rotatable runner, and a housing disposed about the sealing ring. The rotatable runner comprises an outer sealing surface interposed between a higher-pressure end and a lower-pressure end. The sealing ring comprises an inner sealing surface interposed between a higher-pressure face and a lower-pressure face. A plurality of grooves are disposed along the inner sealing surface. A plurality of ducts communicate with the grooves. Each duct passes through the sealing ring from an inlet at the higher-pressure face to an outlet at the groove. The ducts in use receive the hot gas at the higher-pressure face via the inlets and direct the hot gas into the grooves via the outlets. The hot gas moves correspondingly with rotation of the rotatable runner in use. The grooves in use direct the hot gas to form a hydrodynamic flow therein corresponding to rotation of the rotatable runner in use and then the grooves redirect the hot gas in direction of the outer sealing surface to form a thin film between the outer sealing surface and the inner sealing surface. The thin film resists migration of the lubricant from the lower-pressure side to the higher-pressure side. The grooves and the ducts avoid backflow of the hot gas to prevent migration of the lubricant to the higher-pressure side.

In accordance with fourth embodiments, the circumferential sealing assembly includes a rotatable runner, a sealing ring disposed about the rotatable runner, and a housing disposed about the sealing ring. The rotatable runner comprises an outer sealing surface interposed between a higher-pressure end and a lower-pressure end. The sealing ring comprises an inner sealing surface interposed between a higher-pressure face and a lower-pressure face. A plurality of grooves are disposed along the outer sealing surface. A plurality of ducts are arranged so that each duct separately passes through the sealing ring from an inlet at the higher-pressure face to an outlet at the inner sealing surface. The grooves rotate with the rotatable runner. The ducts in use receive the hot gas at the higher-pressure face via the inlets and direct the hot gas toward the outer sealing surface via the outlets. The hot gas enters the grooves to form a hydrodynamic flow therein opposite to rotation of the rotatable runner. The grooves redirect the hot gas in direction of the inner sealing surface to form a thin film between the outer sealing surface and the inner sealing surface. The thin film resists migration of the lubricant from the lower-pressure side to the higher-pressure side. The grooves and the ducts avoid backflow of the hot gas to prevent migration of the lubricant to the higher-pressure side.

In accordance with fifth embodiments, the circumferential sealing assembly includes a sleeve contacting and rotatable by a shaft, a sealing ring disposed about the sleeve, and a housing disposed about the sealing ring. The sleeve comprises an outer sealing surface interposed between a higher-pressure end and a lower-pressure end. The sealing ring comprises an inner sealing surface interposed between a higher-pressure face and a lower-pressure face. A plurality of grooves are disposed along the outer sealing surface. A plurality of ducts communicate with the grooves. Each duct passes through the sleeve from an inlet at the higher-pressure end to an outlet at the groove. The grooves and the ducts rotate with the sleeve. The ducts in use receive the hot gas at the higher-pressure end via the inlets and direct the hot gas into the grooves via the outlets. The hot gas entering the grooves in use via the ducts in combination with rotation of the grooves with the sleeve cause the hot gas to form a hydrodynamic flow within said grooves. The grooves redirect the hot gas in direction of the inner sealing surface to form a thin film between the outer sealing surface and the inner sealing surface. The thin film resists migration of the lubricant from the lower-pressure side to the higher-pressure side. The grooves and the ducts avoid backflow of the hot gas to prevent migration of the lubricant to the higher-pressure side.

In accordance with sixth embodiments, the circumferential sealing assembly includes a sleeve contacting and rotatable by a shaft, a sealing ring disposed about the sleeve, and a housing disposed about the sealing ring. The sleeve comprises an outer sealing surface interposed between a higher-pressure end and a lower-pressure end. The sealing ring comprises an inner sealing surface interposed between a higher-pressure face and a lower-pressure face. A plurality of grooves are disposed along the inner sealing surface. A plurality of ducts are arranged so that each duct separately passes through the sleeve from an inlet at the higher-pressure end to an outlet at the outer sealing surface. The ducts rotate with the sleeve. The ducts in use receive the hot gas at the higher-pressure end via the inlets and direct the hot gas toward the inner sealing surface via the outlets. The hot gas sweepingly impinges the grooves as the outlets rotate with the sleeve thereby causing a hydrodynamic flow by the hot gas within each hydrodynamic groove. The grooves redirect the hot gas in direction of the outer sealing surface to form a thin film between the outer sealing surface and the inner sealing surface. The thin film resists migration of the lubricant from the lower-pressure side to the higher-pressure side. The grooves and the ducts avoid backflow of the hot gas to prevent migration of the lubricant to the higher-pressure side.

In accordance with seventh embodiments, the circumferential sealing assembly includes a sealing ring disposed about the sleeve, and a housing disposed about the sealing ring. the sleeve comprises an outer sealing surface interposed between a higher-pressure end and a lower-pressure end. The sealing ring comprises an inner sealing surface interposed between a higher-pressure face and a lower-pressure face. A plurality of grooves are disposed along the inner sealing surface. A plurality of ducts communicate with the grooves. Each duct passes through the sealing ring from an inlet at the higher-pressure face to an outlet at the groove. The ducts in use receive the hot gas at the higher-pressure face via the inlets and direct the hot gas into the grooves via the outlets. The hot gas moves correspondingly with rotation of the sleeve in use. The grooves in use direct the hot gas to form a hydrodynamic flow therein corresponding to rotation of the sleeve in use and then the grooves redirect the hot gas in direction of the outer sealing surface to form a thin film between the outer sealing surface and the inner sealing surface. The thin film resists migration of the lubricant from the lower-pressure side to the higher-pressure side. The grooves and the ducts avoid backflow of the hot gas to prevent migration of the lubricant to the higher-pressure side.

In accordance with eighth embodiments, the circumferential sealing assembly includes a sleeve contacting and rotatable by a shaft, a sealing ring disposed about the sleeve, and a housing disposed about the sealing ring. The sleeve comprises an outer sealing surface interposed between a higher-pressure end and a lower-pressure end. The sealing ring comprises an inner sealing surface interposed between a higher-pressure face and a lower-pressure face. A plurality of grooves are disposed along the outer sealing surface. A plurality of ducts are arranged so that each duct separately passes through the sealing ring from an inlet at the higher-pressure face to an outlet at the inner sealing surface. The grooves rotate with the sleeve. The ducts in use receive the hot gas at the higher-pressure face via the inlets and direct the hot gas toward the outer sealing surface via the outlets. The hot gas enters the grooves in use to form a hydrodynamic flow therein opposite to rotation of the sleeve. The grooves redirect the hot gas in direction of the inner sealing surface to form a thin film between the outer sealing surface and the inner sealing surface. The thin film resists migration of the lubricant from the lower-pressure side to the higher-pressure side. The grooves and the ducts avoid backflow of the hot gas to prevent migration of the lubricant to the higher-pressure side.

In accordance with other embodiments of the embodiments, the inlets are disposed within a pocket along either the high-pressure end or the high-pressure face.

In accordance with other embodiments of the embodiments, the inlets are circumferentially aligned at either the higher-pressure end or the higher-pressure face.

In accordance with other embodiments of the embodiments, the inlets are radially aligned at ether the higher-pressure end or the higher-pressure face.

In accordance with other embodiments of the embodiments, the rotatable runner is part of and rotatable with a shaft.

In accordance with other embodiments of the embodiments, the rotatable runner and the shaft comprise a metal.

The rotatable runner is cooled via a lubricant spray directed onto the rotatable runner via a nozzle.

In accordance with other embodiments of the embodiments, the rotatable runner is secured to and rotatable with a shaft.

In accordance with other embodiments of the embodiments, the rotatable runner comprises a radial ring and an axial sleeve which further comprise a ceramic. The radial ring is disposed about the shaft so as to be separated at a first end from the shaft via a gap. The axial sleeve extends from the radial ring at a second end. The radial ring is disposed at the first end between a stop extending from the shaft and a locking ring contacting the shaft. A first gasket is interposed disposed between the radial ring and the stop. A second gasket is interposed disposed between the radial ring and the locking ring.

In accordance with other embodiments of the embodiments, an outlet is equidistant between an upstream end and a downstream end of one of the groove.

In accordance with other embodiments of the embodiments, an outlet is biased toward an upstream end of one of the grooves.

In accordance with other embodiments of the embodiments, an outlet is biased toward a downstream end of one of the grooves.

In accordance with other embodiments of the embodiments, at least one of the grooves comprises a base permitting the hydrodynamic flow therein to be unidirectional.

In accordance with other embodiments of the embodiments, at least one of the grooves comprises a base permitting the hydrodynamic flow therein to be bidirectional.

In accordance with other embodiments of the embodiments, the grooves do not intersect either the high-pressure end and the higher-pressure face or do not intersect either the lower-pressure end and the lower-pressure face. The hot gas enters the grooves via only the ducts.

In accordance with other embodiments of the embodiments, at least one groove intersects either the high-pressure end or the higher-pressure face. The hot gas enters the groove(s) at intersection with either the high-pressure end or the higher-pressure face. The hot gas also enters the grooves via the ducts.

In accordance with other embodiments of the embodiments, the sleeve is part of the shaft.

In accordance with other embodiments of the embodiments, the sleeve comprises a ceramic.

In its simplest form, the circumferential sealing assembly includes a segmented sealing ring, preferably carbon, interposed between either a rotatable runner or a sleeve and a housing within a turbine engine.

The improvements include at least one duct which feeds gas to a groove(s) on a rotatable runner, a sleeve, or a sealing ring. The duct is a tube-like passage which allows a gas, typically hot air, originating at a higher-pressure side to pass through either the rotatable runner, the sleeve, or the sealing ring and into a groove along one of the rotatable runner, the sleeve, or the sealing ring. The hot gas within the duct prevents the duct from being a pathway for flow of the lubricant into the higher pressure side. Fluid communicated into a groove via a duct travels along the groove and then is redirected by the groove to form a thin film between the rotatable runner and the sealing ring or between the sleeve and the sealing ring. The thin film separates the rotatable runner and the sealing ring or the sleeve and the sealing ring so as to avoid frictional wear at the interface therebetween. The thin film also prevents lubricant originating at a lower-pressure side from entering the higher-pressure side.

The duct-fed groove avoids backflow of the hot gas in the direction of the higher-pressure side to prevent migration of a lubricant along the groove. The duct avoids backflow of the hot gas in the direction of the higher-pressure side to prevent migration of a lubricant through the duct. The duct and the groove may cooperate to avoid backflow of the hot gas in the direction of the higher-pressure side to prevent migration of a lubricant through the groove and/or the duct.

In first embodiments of the disclosure, the grooves are on the outer diameter surface of the rotatable runner and the duct(s) pass through the rotatable runner. Both grooves and duct(s) rotate with the rotatable runner.

In second embodiments of the disclosure, the grooves are on the inner diameter surface of the sealing ring and the duct(s) pass through the rotatable runner. The duct(s) rotate with the rotatable runner.

In third embodiments of the disclosure, the grooves are on the inner diameter surface of the sealing ring adjacent to the outer diameter surface of the rotatable runner and the duct(s) pass through the sealing ring. Both grooves and duct(s) do not rotate.

In fourth embodiments of the disclosure, the grooves are on the outer diameter surface of the rotatable runner and the duct(s) pass through the sealing ring. The grooves rotate with the rotatable runner.

In fifth embodiments of the disclosure, the grooves are on the outer diameter surface of the sleeve and the duct(s) pass through the sleeve. Both grooves and duct(s) rotate with the sleeve.

In sixth embodiments of the disclosure, the grooves are on the inner diameter surface of the sealing ring and the duct(s) pass through the sleeve. The duct(s) rotate with the sleeve.

In seventh embodiments of the disclosure, the grooves are on the inner diameter surface of the sealing ring adjacent to the outer diameter surface of the sleeve and the duct(s) pass through the sealing ring. Both grooves and duct(s) do not rotate.

In eighth embodiments of the disclosure, the grooves are on the outer diameter surface of the sleeve and the duct(s) pass through the sealing ring. The grooves rotate with the sleeve.

Optional features to the embodiments may include, but are not limited to, one or more of the following. Two or more grooves may be fed by a single duct. Each groove may be fed by a different duct. One or more ducts may intersect a pocket along either a higher-pressure end of the rotatable runner or the sleeve or along a higher-pressure face of the sealing ring. A duct may communicate fluid into or onto the mid-section of a groove. The grooves may be shaped to permit unidirectional or bidirectional hydrodynamic flow. The grooves may be oriented along or angled with respect to the rotation of the rotatable runner or the sleeve. The grooves may be offset or non-offset. One or more grooves may extend to a higher-pressure face or end of the sealing ring, the rotatable runner, or the sleeve so that a gas from the higher-pressure side enters the groove directly and via the duct(s). One or more grooves may not be completely overlayed by a sealing ring so that a gas from the higher-pressure side enters the groove directly and via the duct(s).

One or more of the following advantages may be realized by the disclosure. In one aspect, the circumferential sealing assembly avoids the problem of backflow within grooves. In another aspect, the circumferential sealing assembly maintains a thin film bearing surface between a sealing ring and a rotatable runner or a sleeve which avoids excessive frictional wear along overlapping surfaces. In another aspect, the circumferential sealing assembly maintains a thin film bearing surface between a sealing ring and a rotatable runner or between a sealing ring and a sleeve which minimizes mixing between a lubricant oil and a hot gas. In another aspect, the circumferential sealing assembly may eliminate the need for cooling either a rotatable runner or a sleeve.

The above and other objectives, features, and advantages of the present disclosure will become better understood from the following description, appended claims, and accompanying drawings, in which like reference numerals designate the same or similar elements.

BRIEF DESCRIPTION OF THE DRAWINGS

Additional aspects, features, and advantages of the disclosure will be understood and will become more readily apparent when the disclosure is considered in light of the following description made in conjunction with the accompanying drawings.

FIG. 6a is a plan view illustrating an outer sealing surface of a rotatable runner with a plurality of grooves thereon wherein each groove is fed by a duct in accordance with other embodiments of the disclosure.

FIG. 6b is a side view illustrating a higher-pressure end of the rotatable runner in FIG. 6a wherein inlets of the ducts are circumferentially aligned within an optional pocket at the higher-pressure end in accordance with other embodiments of the disclosure.

FIG. 6c is a cross-section view illustrating the rotatable runner in FIG. 6a wherein an outlet of a duct communicates with one groove in accordance with other embodiments of the disclosure.

FIG. 7a is a plan view illustrating an outer sealing surface of a rotatable runner with a plurality of grooves thereon wherein each groove is fed by a duct in accordance with other embodiments of the disclosure.

FIG. 7b is a side view illustrating a higher-pressure end of the rotatable runner in FIG. 7a wherein inlets of the ducts are radially aligned within an optional pocket at the higher-pressure end in accordance with other embodiments of the disclosure.

FIG. 7c is a cross-section view illustrating the rotatable runner in FIG. 7a wherein an outlet of a duct communicates with one groove in accordance with other embodiments of the disclosure.

FIG. 8a is a plan view illustrating an outer sealing surface of a rotatable runner with a plurality of grooves thereon wherein each groove is fed by a duct in accordance with other embodiments of the disclosure.

FIG. 8b is a side view illustrating a higher-pressure end of the rotatable runner in FIG. 8a wherein inlets of the ducts are circumferentially aligned within an optional pocket along the higher-pressure end in accordance with other embodiments of the disclosure.

FIG. 15 is a plan view illustrating a sealing surface of a rotatable runner, a sealing ring, or a sleeve with grooves thereon wherein a duct communicates either adjacent to an end of a groove or a distance from an end in accordance with other embodiments of the disclosure.

FIG. 16a is a cross-section view illustrating a groove with non-uniform depth wherein a gas enters at one end of the groove at either a static location along a base of the groove or a static or dynamic location adjacent to an opening of the groove in accordance with other embodiments of the disclosure.

FIG. 16b is a cross-section view illustrating a groove with uniform depth wherein a gas enters at one end of the groove at either a static location along a base of the groove or a static or dynamic location adjacent to an opening of the groove in accordance with other embodiments of the disclosure.

FIG. 16c is a cross-section view illustrating a groove with uniform depth wherein a gas enters a distance from one end of the groove at either a static location along a base of the groove or a static or dynamic location adjacent to an opening of the groove in accordance with other embodiments of the disclosure.

FIG. 16d is a cross-section view illustrating a groove with non-uniform depth wherein a gas enters a distance from one end of the groove at either a static location along a base of the groove or a static or dynamic location adjacent to an opening of the groove in accordance with other embodiments of the disclosure.

FIG. 17 is a plan view illustrating a sealing surface of a rotatable runner, a sealing ring, or a sleeve with grooves thereon wherein each groove intersects either a higher-pressure end of the rotatable runner or a higher-pressure face of the sealing ring so that a gas may enter each groove directly from the higher-pressure side in addition to via a duct in accordance with other embodiments of the disclosure.

DETAILED DESCRIPTION

Figure 1A:
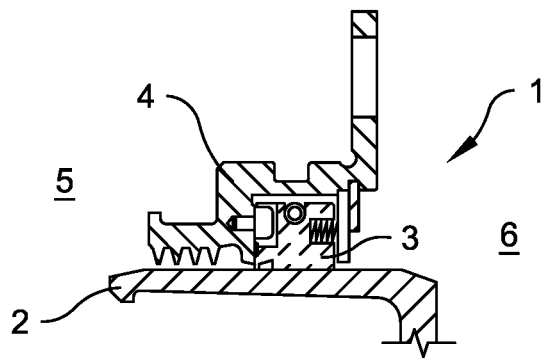
FIG. 1a is a cross-sectional view illustrating an exemplary sealing assembly from the prior art wherein a sealing ring is disposed about a rotatable runner and the sealing ring is supported about the rotatable runner via a housing.
Figure 1B:
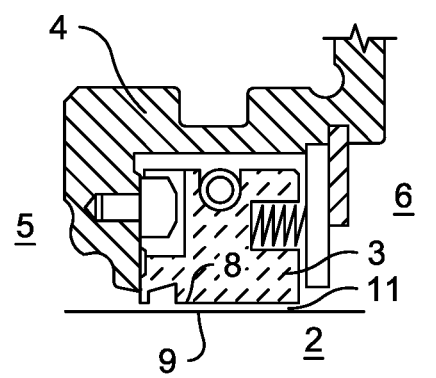
FIG. 1b is an enlarged cross-sectional view of the sealing assembly in FIG. 1a illustrating location of a thin film seal formed in use between an inner surface of the sealing ring and an outer surface of the rotatable runner.
Figure 1C:
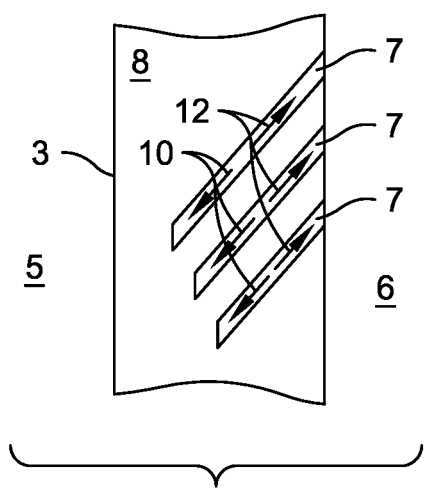
FIG. 1c is an enlarged plan view of the inner surface of the sealing assembly in FIGS. 1a and 1b illustrating exemplary grooves which utilize a gas from a higher-pressure side to form the thin film between the sealing ring and the rotatable runner so as to avoid mixing between a lubricant oil originating within a lower-pressure side and a gas originating within the higher-pressure side.

Reference will now be made in detail to several embodiments of the disclosure that are illustrated in the accompanying drawings. Wherever possible, same or similar reference numerals may be used in the drawings and the description to refer to the same or like parts.

While features of various embodiments are separately described herein, it is understood that such features may be combinable to form other additional embodiments.

One or more components described herein may be manufactured via methods, processes, and techniques understood in the art, including, but not limited to, machining, molding, forming, casting, or three-dimensional printing.

The drawing figures are not necessarily drawn to scale, but instead are drawn to provide a better understanding of the components thereof, and are not intended to be limiting in scope, but to provide exemplary illustrations.

Referring now to FIGS. 2, 3, 9, and 10, the circumferential sealing assembly 13 includes a rotatable runner 16, a sealing ring 17 circumferentially disposed about the rotatable runner 16, and a housing 18 circumferentially disposed about the sealing ring 17. The rotatable runner 16, the sealing ring 17, and the housing 18 cooperate to separate a lower-pressure side 14 with a lubricant oil therein from a higher-pressure side 15 with a hot gas therein. The rotatable runner 16 is attached to and rotates with a shaft (not shown). The sealing ring 17 includes two or more arc-shaped segments that form a ring-shaped structure. The segments in the assembled form of the sealing ring 17 may be biased toward the rotatable runner 16 via an optional garter spring 19 or the like contacting an outer surface 27 of each segment. Adjacent segments are configured to allow expansion and contraction of the sealing ring 17 in response to conditions within a turbine engine. The housing 18 is configured to support the sealing ring 17 as it sealingly engages the rotatable runner 16. A locking ring 20 may be removably secured to the housing 18 so as to secure the sealing ring 17 within the housing 18.

Figure 2:
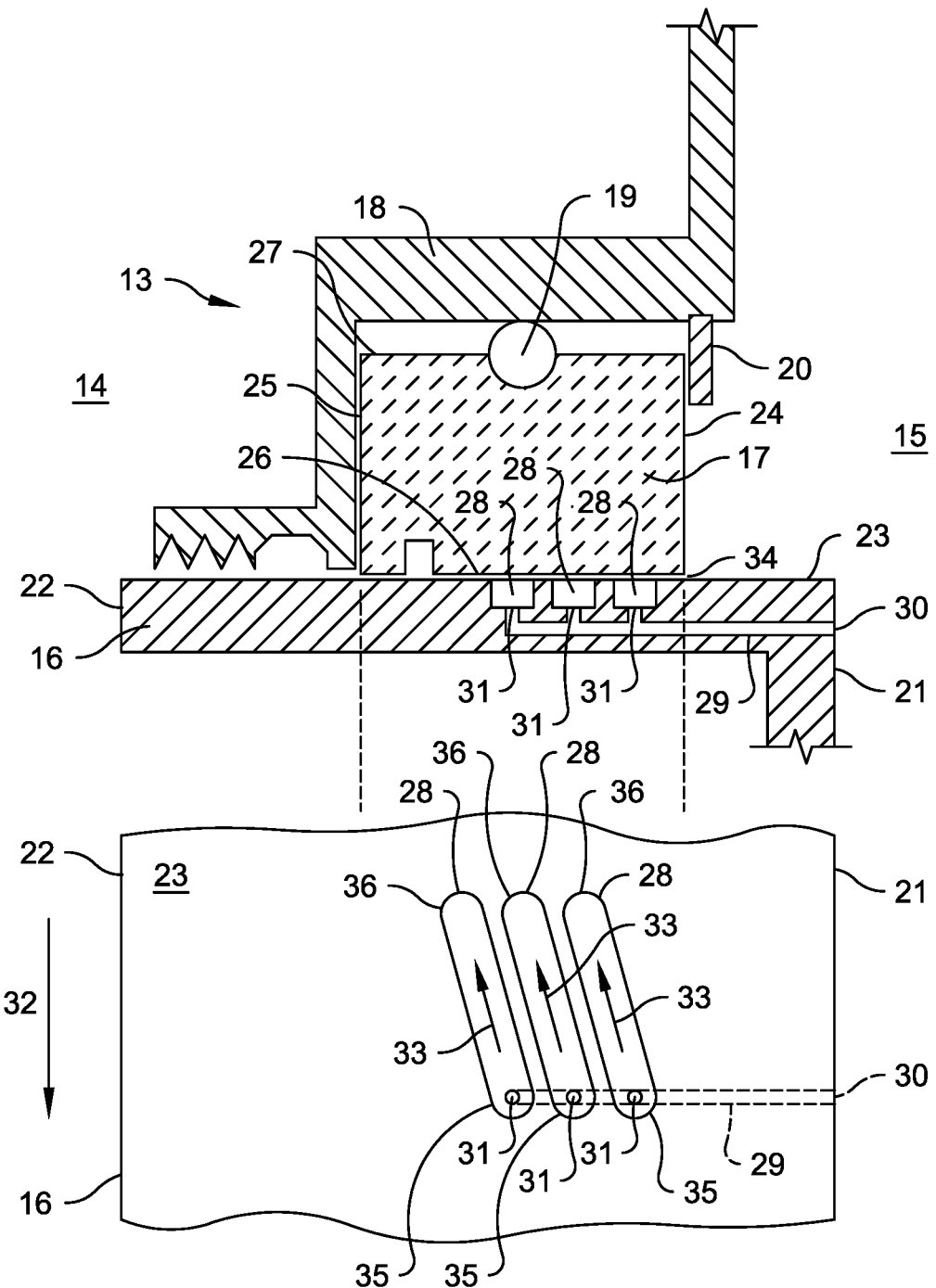
FIG. 2 is a partial cross-section view illustrating a circumferential sealing assembly separating a lower-pressure side and a higher-pressure side wherein grooves are disposed along an outer sealing surface of a rotatable runner and a gas originating from the higher-pressure side is communicated to the grooves via duct(s) passing through the rotatable runner in accordance with a first embodiment of the disclosure.

Referring now to FIG. 2, the rotatable runner 16 includes a higher-pressure end 21 defined by a surface at the higher-pressure side 15, a lower-pressure end 22 defined by a surface at the lower-pressure side 14, and an outer sealing surface 23 interposed between the higher-pressure end 21 and the lower-pressure end 22. At least one duct 29 passes through the structure defining the rotatable runner 16. Each duct 29 is a passageway which allows a hot gas originating at the higher-pressure side 15 to enter and pass through the interior of the rotatable runner 16 in the direction of the lower-pressure side 14. Each duct 29 includes an inlet 30 disposed at the higher-pressure end 21. Each duct 29 extends into the rotatable runner 16 in the direction of a lower-pressure end 22. Each duct 29 includes at least one outlet 31. The ducts 29 traverse the rotatable runner 16 so that the outlets 31 communicate with a plurality of grooves 28 disposed along the outer sealing surface 23. In some embodiments, a duct 29 may include one or more outlets 31 which communicate with a single groove 28. In other embodiments, a duct 29 may include two or more outlets 31 which separately communicate with an equal number of grooves 28. The arrangement of the inlet 30 and the outlet(s) 31 allows a hot gas to enter the duct 29 at the higher-pressure side 15 and exit the duct 29 into the groove 28. The grooves 28 may be diagonally arranged along the outer sealing surface 23, however other arrangements are possible.

Referring again to FIG. 2, each groove 28 extends into the rotatable runner 16 from the outer sealing surface 23. Each groove 28 includes an upstream end 35 and a downstream end 36. Two or more grooves 28 are arranged side-by-side at the overlay between the rotatable runner 16 and the sealing ring 17 to form a group. A plurality of groups are provided along the outer sealing surface 23. A hot gas enters a groove 28 via the outlet 31, preferably at the upstream end 35, and then the hot gas is directed along the groove 28, preferably toward the downstream end 36. The hot gas forms a hydrodynamic flow 33 within the grooves 28 opposite to the rotation 32 of the rotatable runner 16. The combined effects of the hot gas entering the groove 28 via the duct 29 and the rotation of the groove 28 relative to the hot gas cause the hydrodynamic flow 33 from the upstream end 35 to the downstream end 36 within the groove 28. The flow 33 is hydrodynamic, therefore the grooves 28 are hydrodynamic, because of the hot gas entering the grooves 28 via the duct(s) 29 and the hot gas interacting with the walls of the grooves 28 as the grooves 28 rotate with the rotatable runner 16.

Referring again to FIG. 2, the sealing ring 17 includes a higher-pressure face 24 defined by a surface at the higher-pressure side 15, a lower-pressure face 25 defined by a surface at the lower-pressure side 14, and an inner sealing surface 26 interposed between the higher-pressure face 24 and the lower-pressure face 25. The sealing ring 17 is positioned so that the inner sealing surface 26 overlays the grooves 28. The overlapping arrangement between the outer sealing surface 23 and the inner sealing surface 26 facilitates formation of a thin film 34 therebetween when the hot gas is redirected, preferably at the downstream end 36, by each groove 28 along the outer sealing surface 23 in the direction of the inner sealing surface 26. In preferred embodiments, the grooves 28 are positioned along the outer sealing surface 23 so as to not intersect the higher-pressure end 21 and the lower-pressure end 22. This latter feature ensures that the grooves 28 only receive the hot gas via the ducts 29, when the inner sealing surface 26 completely overlays the grooves 28 as illustrated in the non-limiting example in FIG. 2.

Figure 3:
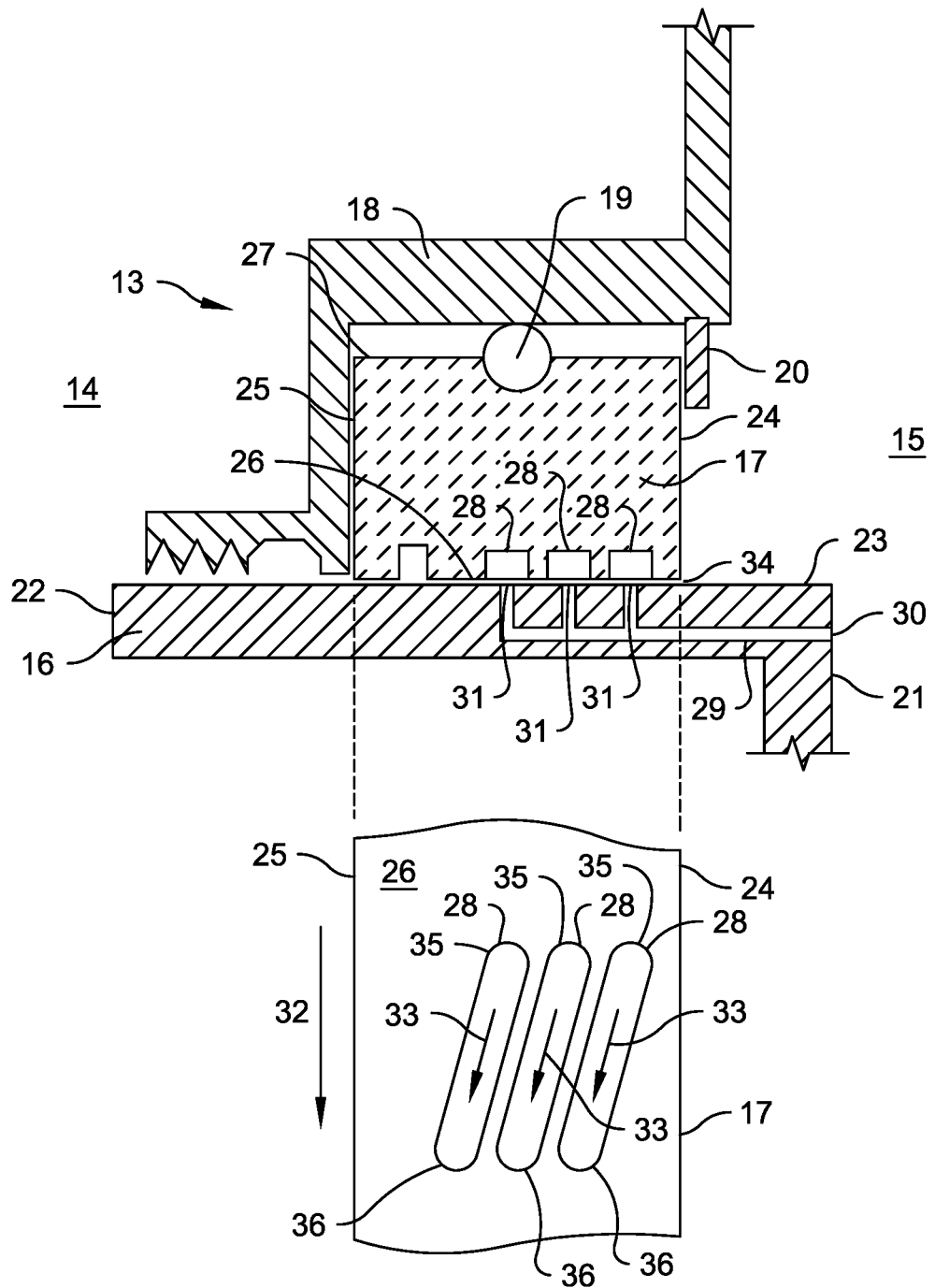
FIG. 3 is a partial cross-section view illustrating a circumferential sealing assembly separating a lower-pressure side and a higher-pressure side wherein grooves are disposed along an inner sealing surface of a sealing ring and a gas originating from the higher-pressure side is communicated into the grooves via duct(s) passing through a rotatable runner in accordance with a second embodiment of the disclosure.

Referring now to FIG. 3, the rotatable runner 16 includes a higher-pressure end 21 defined by a surface at the higher-pressure side 15, a lower-pressure end 22 defined by a surface at the lower-pressure side 14, and an outer sealing surface 23 interposed between the higher-pressure end 21 and the lower-pressure end 22. At least one duct 29 passes through the structure defining the rotatable runner 16. Each duct 29 is a passageway which allows a hot gas originating at the higher-pressure side 15 to enter and pass through the interior of the rotatable runner 16 in the direction of the lower-pressure side 14. Each duct 29 includes an inlet 30 disposed at the higher-pressure end 21. Each duct 29 extends into the rotatable runner 16 in the direction of a lower-pressure end 22. Each duct 29 includes at least one outlet 31. The ducts 29 traverse the rotatable runner 16 so that the outlets 31 are disposed along the outer sealing surface 23, such as illustrated by way of the non-limiting example in FIG. 5. In some embodiments, a duct 29 may include one outlet 31. In other embodiments, a duct 29 may include two or more outlets 31. The arrangement of the inlet 30 and the outlet(s) 31 allows a hot gas to enter the duct 29 at the higher-pressure side 15 and exit the duct 29 at the outer sealing surface 23.

Referring again to FIG. 3, the sealing ring 17 includes a higher-pressure face 24 defined by a surface at the higher-pressure side 15, a lower-pressure face 25 defined by a surface at the lower-pressure side 14, and an inner sealing surface 26 interposed between the higher-pressure face 24 and the lower-pressure face 25. A plurality of grooves 28 are disposed along the inner sealing surface 26 of the sealing ring 17. Each groove 28 extends into the sealing ring 17 from the inner sealing surface 26. Each groove 28 includes an upstream end 35 and a downstream end 36. Two or more grooves 28 are arranged side-by-side at the overlay between the rotatable runner 16 and the sealing ring 17 to form a group. A plurality of groups are provided along the inner sealing surface 26. A hot gas is directed into each groove 28, between the upstream end 35 and the downstream end 36, via the outlets 31. The hot gas forms a hydrodynamic flow 33 within the grooves 28 in the same direction to the rotation 32 by the rotatable runner 16. The hot gas sweepingly impinges the grooves 28 as the outlets 31 of the ducts 29 rotate with the rotatable runner 16 relative to the grooves 28 thereby causing the hydrodynamic flow 33. The flow 33 is hydrodynamic, therefore the grooves 28 are hydrodynamic, because of the hot gas entering the grooves 28 via the duct(s) 29 in a sweeping action so that the hot gas interacts with and flows along the walls of the grooves 28 even when the grooves 28 are not rotated by the sealing ring 17.

Referring again to FIG. 3, the rotatable runner 16 is positioned so that the outer sealing surface 23 overlays the grooves 28. The overlapping arrangement between the outer sealing surface 23 and the inner sealing surface 26 facilitates formation of a thin film 34 therebetween when the hot gas is redirected, preferably at the downstream end 36, by each groove 28 along the inner sealing surface 26 in the direction of the outer sealing surface 23. In preferred embodiments, the grooves 28 are positioned along the inner sealing surface 26 so as to not intersect the higher-pressure face 24 and the lower-pressure face 25. This latter feature ensures that the grooves 28 only receive the hot gas via the ducts 29, when the outer sealing surface 23 completely overlays the grooves 28 as illustrated in the non-limiting example in FIG. 3.

Figure 4:
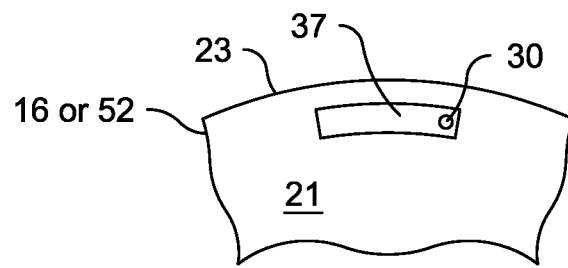
FIG. 4 is a side view illustrating a higher-pressure end of a rotatable runner or a sleeve wherein an inlet of a duct is disposed within an optional pocket in accordance with other embodiments of the disclosure.

Referring now to FIG. 4, one or more inlets 30 for the embodiments in FIGS. 2 and 3 may be disposed within a pocket 37 which extends into the higher-pressure end 21 of the rotatable runner 16. The pocket 37 may be biased toward the outer sealing surface 23 to minimize the radial travel distance between the inlet(s) 30 and the outlet(s) 31. The inlet(s) 30 may be positioned within the pocket 37 to maximize the hydrodynamic or pump effect by the pocket 37 with respect to feed of the hot gas into the ducts 29 via the inlet(s) 30.

Figure 5:
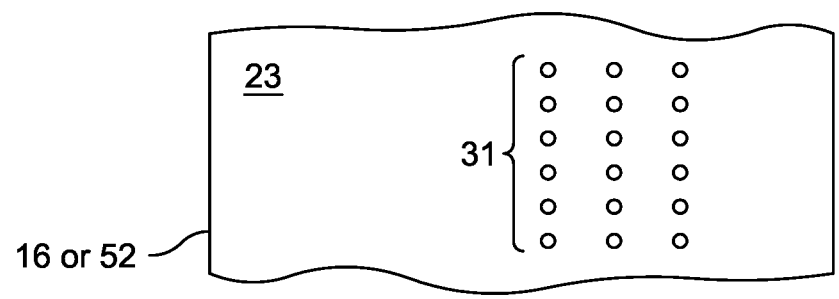
FIG. 5 is a plan view illustrating an outer sealing surface of a rotatable runner or a sleeve with a plurality of outlets disposed thereon in accordance with other embodiments of the disclosure.

Referring now to FIG. 5, a plurality of outlets 31 may be disposed along the outer sealing surface 23 for the embodiment in FIG. 3. In preferred embodiments, the outlets 31 may be arranged in a pattern suitable for continuously or intermittently communicating a hot gas onto the inner sealing surface 26 of the sealing ring 17 which establishes a hydrodynamic flow 33 within each groove 28. In some embodiments, the outlets 31 may be fed by an equal number of ducts 29. In other embodiments, two or more outlets 31 may be fed by one duct 29. The ducts 29 may be arranged within the rotatable runner 16 as illustrated by way the non-limiting examples in FIGS. 2, 3, and 6a-8b.

Referring now to FIGS. 6a-6c, a duct 29 may communicate with an outlet 31 disposed within a groove 28 extending into the rotatable runner 16 from the outer sealing surface 23. The ducts 29 may be positioned, sized, shaped, angled, offset, and/or otherwise disposed, arranged, or configured so as to separately pass through the rotatable runner 16 between the higher-pressure end 21 and the grooves 28. In some embodiments, the inlets 30 may be circumferentially aligned at the higher-pressure end 21; however, other arrangements are possible. In other embodiments, the inlets 30 may be circumferentially aligned within and communicable with a pocket 37 extending into the rotatable runner 16 at the higher-pressure end 21. The grooves 28 may be axially aligned side-by-side along the outer sealing surface 23, however other arrangements are possible.

Referring now to FIGS. 7a-7c, a duct 29 may communicate with an outlet 31 disposed within a groove 28 extending into the rotatable runner 16 from the outer sealing surface 23. The ducts 29 may be positioned, sized, shaped, angled, offset, and/or otherwise disposed, arranged, or configured so as to separately pass through the rotatable runner 16 between the higher-pressure end 21 and the grooves 28. In some embodiments, the inlets 30 may be radially aligned at the higher-pressure end 21; however, other arrangements are possible. In yet other embodiments, the inlets 30 may be radially aligned within and communicable with a pocket 37 extending into the rotatable runner 16 at the higher-pressure end 21. The grooves 28 may be axially aligned side-by-side along the outer sealing surface 23, however other arrangements are possible.

Referring now to FIGS. 8a-8b, a duct 29 may communicate with an outlet 31 disposed within a groove 28 extending into the rotatable runner 16 from the outer sealing surface 23. The ducts 29 may be positioned, sized, shaped, angled, offset, and/or otherwise disposed, arranged, or configured so as to separately pass through the rotatable runner 16 between the higher-pressure end 21 and the grooves 28. The inlets 30 may be circumferentially aligned at the higher-pressure end 21; however, other arrangements are possible. The inlets 30 may be disposed within an optional pocket 37. The grooves 28 may be axially aligned and differing in length; however, other arrangements are possible.

Figure 9:
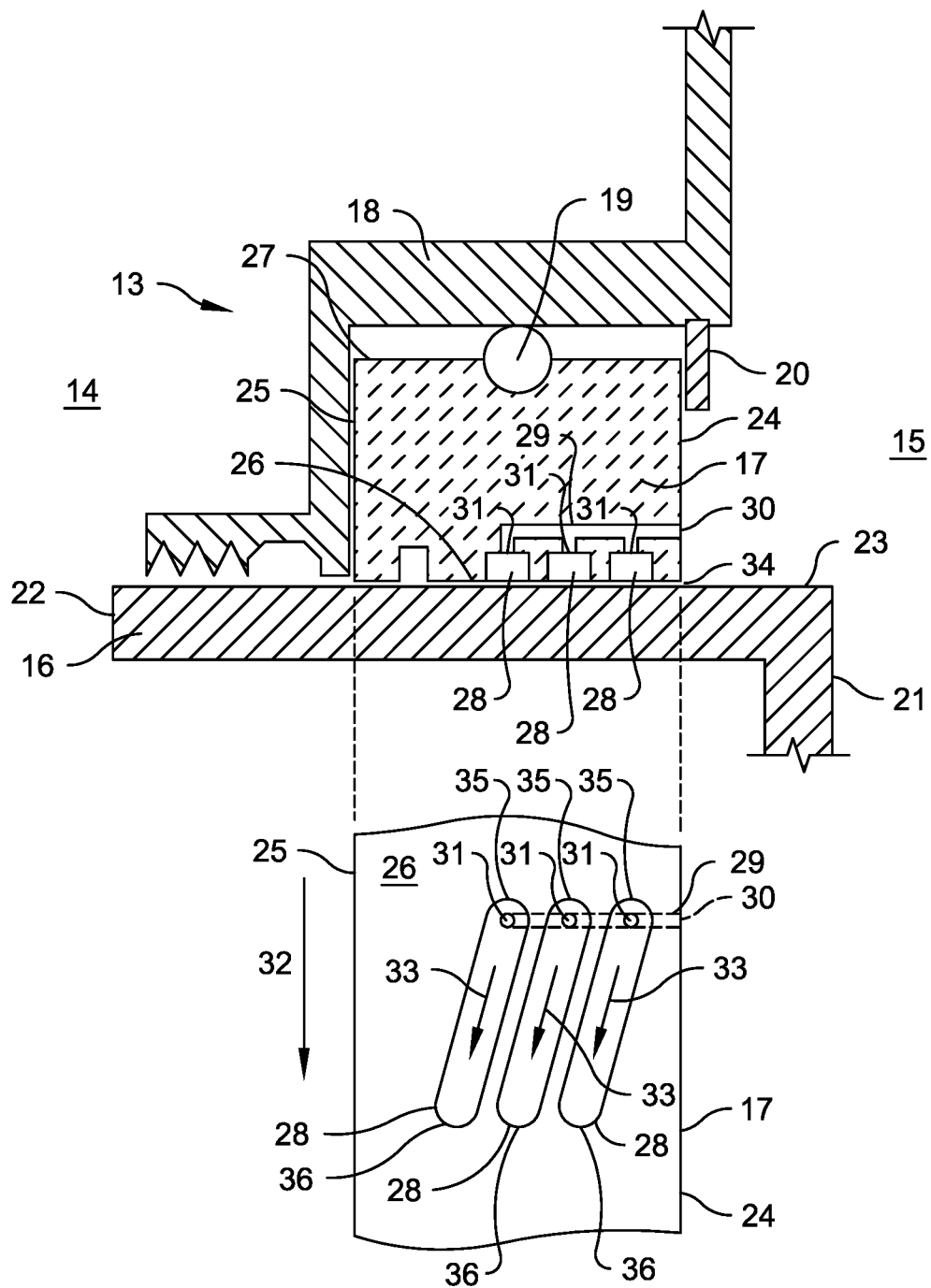
FIG. 9 is a partial cross-section view illustrating a circumferential sealing assembly separating a lower-pressure side and a higher-pressure side wherein grooves are disposed along an inner sealing surface of a sealing ring adjacent to an outer sealing surface of a rotatable runner and a gas originating from the higher-pressure side is communicated to the grooves via a duct(s) passing through the sealing ring in accordance with a third embodiment of the disclosure.

Referring now to FIG. 9, the sealing ring 17 includes a higher-pressure face 24 defined by a surface at the higher-pressure side 15, a lower-pressure face 25 defined by a surface at the lower-pressure side 14, and an inner sealing surface 26 interposed between the higher-pressure face 24 and the lower-pressure face 25. At least one duct 29 passes through the structure defining the sealing ring 17. Each duct 29 is a passageway which allows a hot gas originating at the higher-pressure side 15 to enter and pass through the interior of the sealing ring 17 in the direction of the lower-pressure side 14. Each duct 29 includes an inlet 30 disposed at the higher-pressure face 24. Each duct 29 extends into the sealing ring 17 in the direction of a lower-pressure face 25. Each duct 29 includes at least one outlet 31. The ducts 29 traverse the sealing ring 17 so that the outlets 31 communicate with a plurality of grooves 28 disposed along the inner sealing surface 26. In some embodiments, a duct 29 may include one or more outlets 31 which communicate with a single groove 28. In other embodiments, a duct 29 may include two or more outlets 31 which separately communicate with an equal number of grooves 28. The arrangement of the inlet 30 and the outlet(s) 31 allows a hot gas to enter the duct 29 at the higher-pressure side 15 and exit the duct 29 into the groove 28.

Referring again to FIG. 9, each groove 28 extends into the sealing ring 17 from the inner sealing surface 26. Each groove 28 includes an upstream end 35 and a downstream end 36. Two or more grooves 28 are arranged side-by-side at the overlay between the rotatable runner 16 and the sealing ring 17 to form a group. A plurality of groups are provided along the inner sealing surface 26. A hot gas enters a groove 28 via the outlet 31, preferably at the upstream end 35, and then the hot gas is directed along the groove 28, preferably toward the downstream end 36. The hot gas forms a hydrodynamic flow 33 within the grooves 28 in the same direction as the rotation 32 of the rotatable runner 16.

Referring again to FIG. 9, the rotatable runner 16 includes a higher-pressure end 21 defined by a surface at the higher-pressure side 15, a lower-pressure end 22 defined by a surface at the lower-pressure side 14, and an outer sealing surface 23 interposed between the higher-pressure end 21 and the lower-pressure end 22. The sealing ring 17 is positioned so that the inner sealing surface 26 overlays a portion of the outer sealing surface 23. The overlapping arrangement between the outer sealing surface 23 and the inner sealing surface 26 facilitates formation of a thin film 34 therebetween when the hot gas is redirected, preferably at the downstream end 36, by each groove 28 along the inner sealing surface 26 in the direction of the outer sealing surface 23. The flow 33 is hydrodynamic, therefore the grooves 28 are hydrodynamic, because of the windage resulting when the outer sealing surface 23 rotates with the rotatable runner 16 adjacent to the inner sealing surface 26. In preferred embodiments, the grooves 28 are positioned along the inner sealing surface 26 so as to not intersect the higher-pressure face 24 and the lower-pressure face 25. This latter feature ensures that the grooves 28 only receive the hot gas via the ducts 29, when the outer sealing surface 23 completely overlays the grooves 28 as illustrated in the non-limiting example in FIG. 9.

Figure 10:
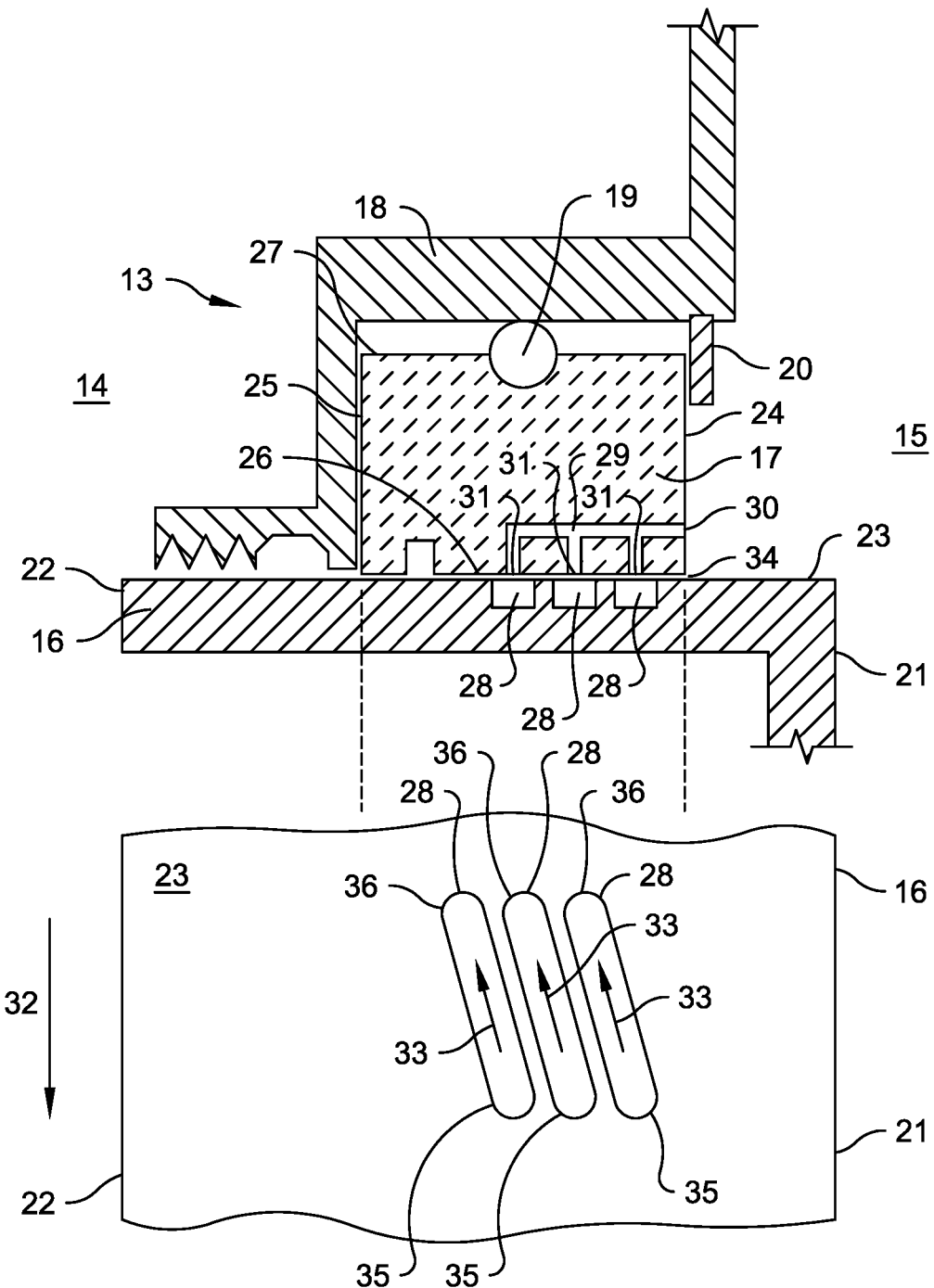
FIG. 10 is a partial cross-section view illustrating a circumferential sealing assembly separating a lower-pressure side and a higher-pressure side wherein grooves are disposed along an outer sealing surface of a rotatable runner and a gas originating from the higher-pressure side is communicated into the grooves via duct(s) passing through a sealing ring in accordance with a fourth embodiment of the disclosure.

Referring now to FIG. 10, the sealing ring 17 includes a higher-pressure face 24 defined by a surface at the higher-pressure side 15, a lower-pressure face 25 defined by a surface at the lower-pressure side 14, and an inner sealing surface 26 interposed between the higher-pressure face 24 and the lower-pressure face 25. At least one duct 29 passes through the structure defining the sealing ring 17. Each duct 29 is a passageway which allows a hot gas originating at the higher-pressure side 15 to enter and pass through the interior of the sealing ring 17 in the direction of the lower-pressure side 14. Each duct 29 includes an inlet 30 disposed at the higher-pressure face 24. Each duct 29 extends into the sealing ring 17 in the direction of a lower-pressure face 25. Each duct 29 includes at least one outlet 31. The ducts 29 traverse the sealing ring 17 so that the outlets 31 are disposed along the inner sealing surface 26, such as illustrate by way of the non-limiting example in FIG. 12. In some embodiments, a duct 29 may include one outlet 31. In other embodiments, a duct 29 may include two or more outlets 31. The arrangement of the inlet 30 and the outlet(s) 31 allows a hot gas to enter the duct 29 at the higher-pressure side 15 and exit the duct 29 at the inner sealing surface 26.

Referring again to FIG. 10, the rotatable runner 16 includes a higher-pressure end 21 defined by a surface at the higher-pressure side 15, a lower-pressure end 22 defined by a surface at the lower-pressure side 14, and an outer sealing surface 23 interposed between the higher-pressure end 21 and the lower-pressure end 22. A plurality of grooves 28 are disposed along the outer sealing surface 23 of the rotatable runner 16. Each groove 28 extends into the rotatable runner 16 from the outer sealing surface 23. Each groove 28 includes an upstream end 35 and a downstream end 36. Two or more grooves 28 are arranged side-by-side at the overlay between the rotatable runner 16 and the sealing ring 17 to form a group. A plurality of groups are provided along the outer sealing surface 23. A hot gas is directed into each groove 28, between the upstream end 35 and the downstream end 36, via the outlets 31. The hot gas forms a hydrodynamic flow 33 within the grooves 28 opposite to the rotation 32 by the rotatable runner 16. The hot gas impinges the grooves 28 as the grooves 28 rotate with the rotatable runner 16 relative to the outlets 31. The flow 33 is hydrodynamic, therefore the grooves 28 are hydrodynamic, because of the impingement as the grooves 28 rotate with the rotatable runner 16.

Referring again to FIG. 10, the sealing ring 17 is positioned so that the inner sealing surface 26 overlays a portion of the outer sealing surface 23. The overlapping arrangement between the outer sealing surface 23 and the inner sealing surface 26 facilitates formation of a thin film 34 therebetween when the hot gas is redirected, preferably at the downstream end 36, by each groove 28 along the outer sealing surface 23 in the direction of the inner sealing surface 26. In preferred embodiments, the grooves 28 are positioned along the outer sealing surface 23 so as to not intersect the higher-pressure end 21 and the lower-pressure end 22. This latter feature ensures that the grooves 28 only receive the hot gas via the ducts 29, when the inner sealing surface 26 completely overlays the grooves 28 as illustrated in the non-limiting example in FIG. 10.

Figure 11:
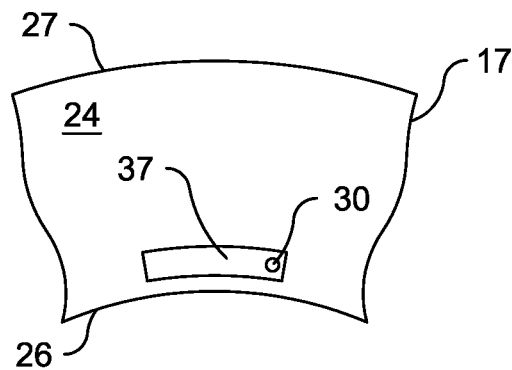
FIG. 11 is a side view illustrating a higher-pressure face of a sealing ring wherein an inlet end of a duct is disposed within an optional pocket in accordance with other embodiments of the disclosure.

Referring now to FIG. 11, one or more inlets 30 for the embodiments in FIGS. 9 and 10 may be disposed within a pocket 37 which extends into the higher-pressure face 24 of the sealing ring 17. The pocket 37 may be biased toward the inner sealing surface 26 to minimize the radial travel distance between the inlet(s) 30 and the outlet(s) 31. The inlet(s) 30 may be positioned within the pocket 37 to maximize the hydrodynamic or pump effect by the pocket 37 with respect to feed of the hot gas into the ducts 29 via the inlet(s) 30.

Figure 12:
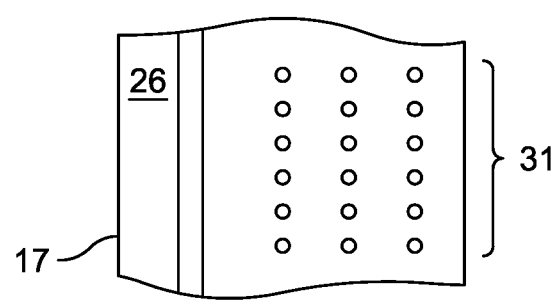
FIG. 12 is a plan view illustrating an inner sealing surface of a sealing ring with a plurality of outlets disposed thereon in accordance with other embodiments of the disclosure.

Referring now to FIG. 12, a plurality of outlets (31) may be disposed along the inner sealing surface 26 for the embodiment in FIG. 10. The outlets (31) may be arranged in a pattern suitable for continuously or intermittently communicating a hot gas into each groove 28 along the outer sealing surface 23. The outlets 31 may enhance or supplement the hydrodynamic flow 33 within each groove 28 resulting from rotation of the grooves 28 by the rotatable runner 16. In some embodiments, the outlets (31) may be fed by an equal number of ducts 29. In other embodiments, two or more outlets (31) may be fed by one duct 29. The ducts 29 may be arranged within the sealing ring 17 as illustrated by way the non-limiting examples in FIGS. 9, 10, and 13a-14b.

Figure 13A:
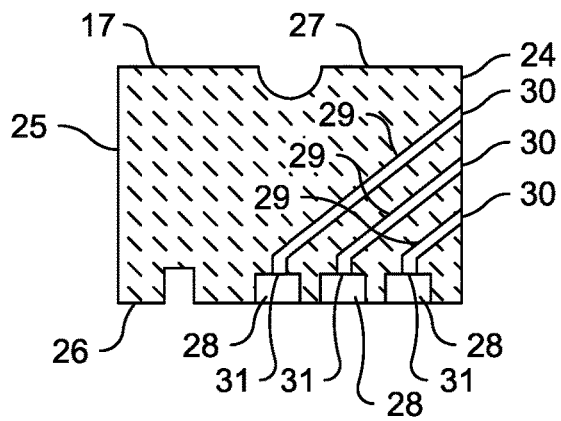
FIG. 13a is a cross-section view illustrating a sealing ring with a plurality of grooves thereon wherein each groove is fed by a duct in accordance with other embodiments of the disclosure.
Figure 13B:
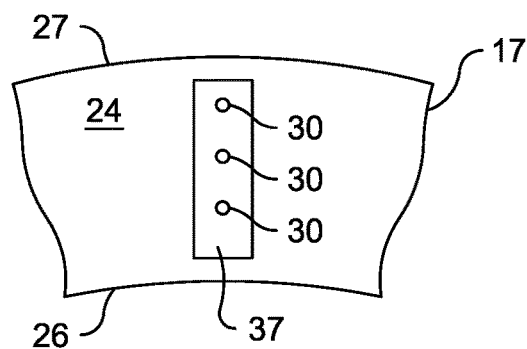
FIG. 13b is a cross-section view illustrating a higher-pressure face of the sealing ring in FIG. 13a wherein inlets of the ducts are radially aligned within an optional pocket along the higher-pressure face in accordance with other embodiments of the disclosure.

Referring now to FIG. 13a-13b, a duct 29 may communicate with an outlet 31 disposed within a groove 28 extending into the sealing ring 17 from the inner sealing surface 26 in the direction of the outer surface 27. The ducts 29 may be positioned, sized, shaped, angled, offset, and/or otherwise disposed, arranged, or configured so as to separately pass in the direction of the lower-pressure face 25 and through the sealing ring 17 between the higher-pressure face 24 and the grooves 28. In some embodiments, the inlets 30 may be radially aligned at the higher-pressure face 24; however, other arrangements are possible. In other embodiments, the inlets 30 may be radially aligned within and communicable with a pocket 37 extending into the sealing ring 17 at the higher-pressure face 24.

Figure 14A:
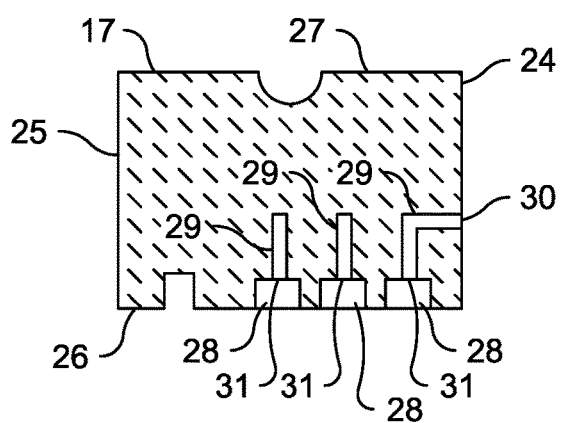
FIG. 14a is a cross-section view illustrating a sealing ring with a plurality of grooves thereon wherein each groove is fed by a duct in accordance with other embodiments of the disclosure.
Figure 14B:
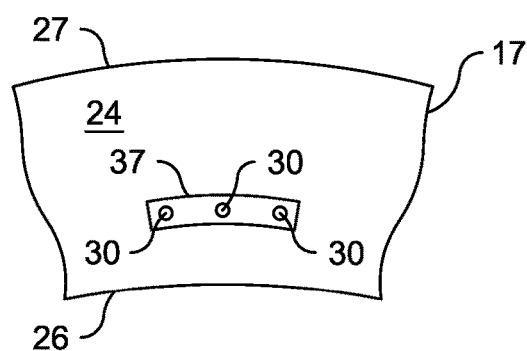
FIG. 14b is a cross-section view illustrating a higher-pressure face of the sealing ring in FIG. 14a wherein inlets of the ducts are circumferentially aligned within an optional pocket along the higher-pressure face in accordance with other embodiments of the disclosure.
Figure 18A:
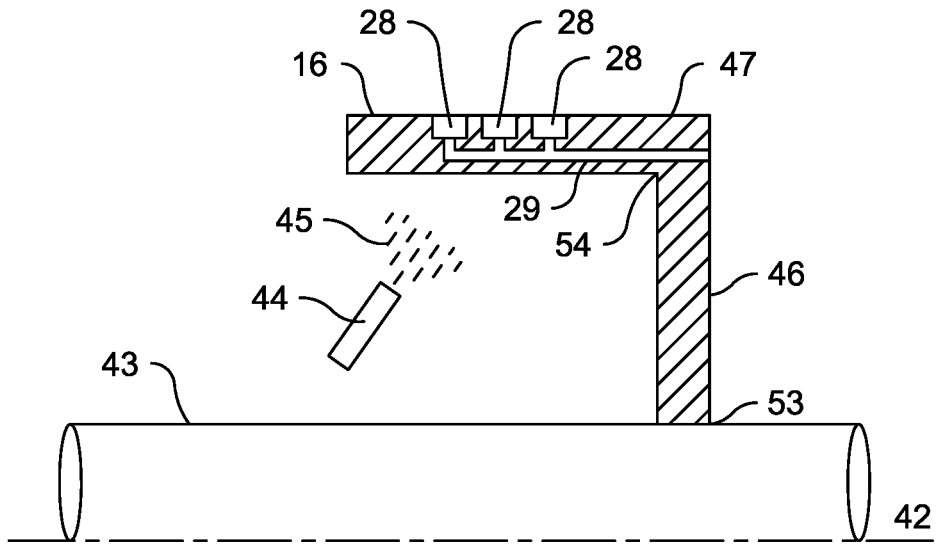
FIG. 18a is a cross-section view illustrating a circumferential sealing assembly as in FIG. 2 wherein a rotatable runner extends from and is part of a shaft in accordance with other embodiments of the disclosure.
Figure 18B:
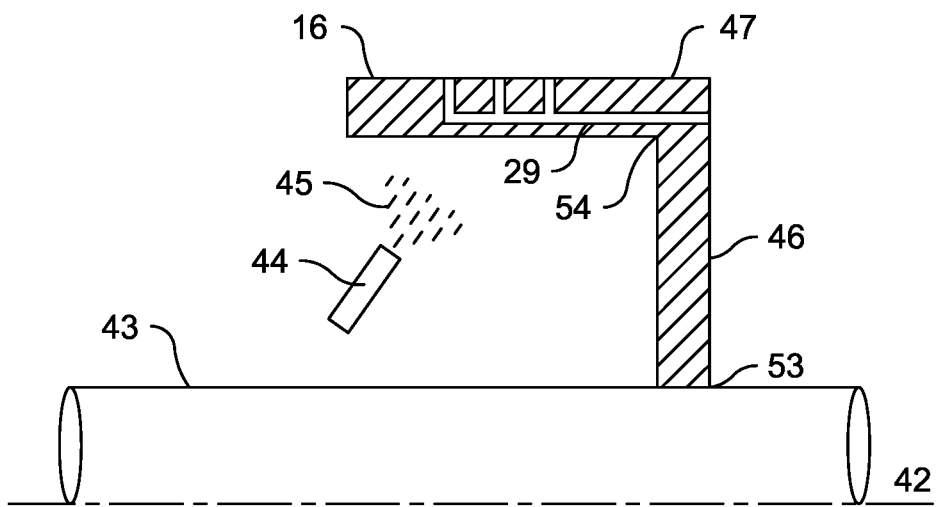
FIG. 18b is a cross-section view illustrating a circumferential sealing assembly as in FIG. 3 wherein a rotatable runner extends from and is part of a shaft in accordance with other embodiments of the disclosure.
Figure 18C:
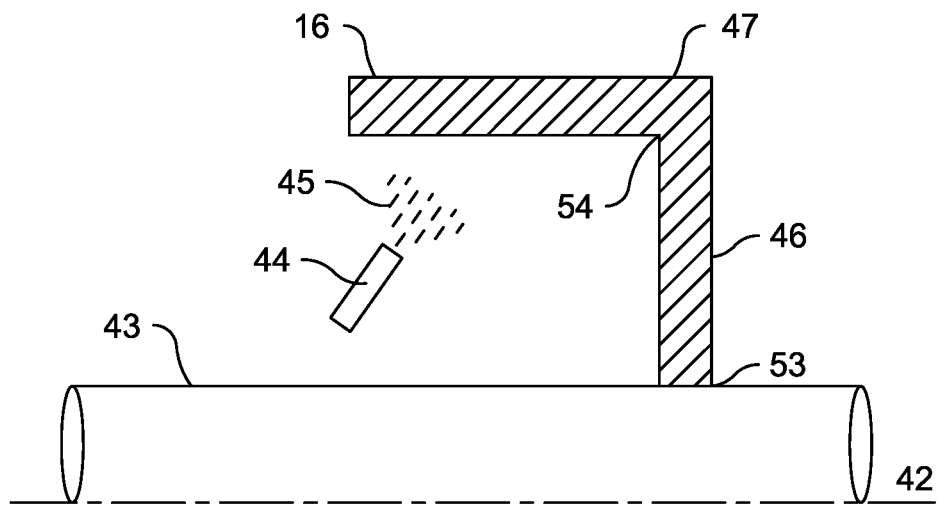
FIG. 18c is a cross-section view illustrating a circumferential sealing assembly as in FIG. 9 wherein a rotatable runner extends from and is part of a shaft in accordance with other embodiments of the disclosure.
Figure 18D:
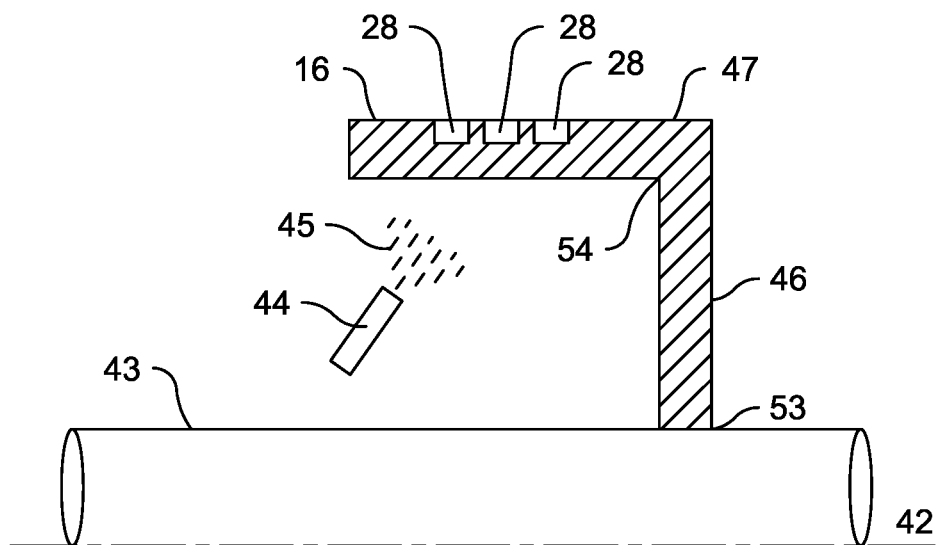
FIG. 18d is a cross-section view illustrating a circumferential sealing assembly as in FIG. 10 wherein a rotatable runner extends from and is part of a shaft in accordance with other embodiments of the disclosure.
Figure 19A:
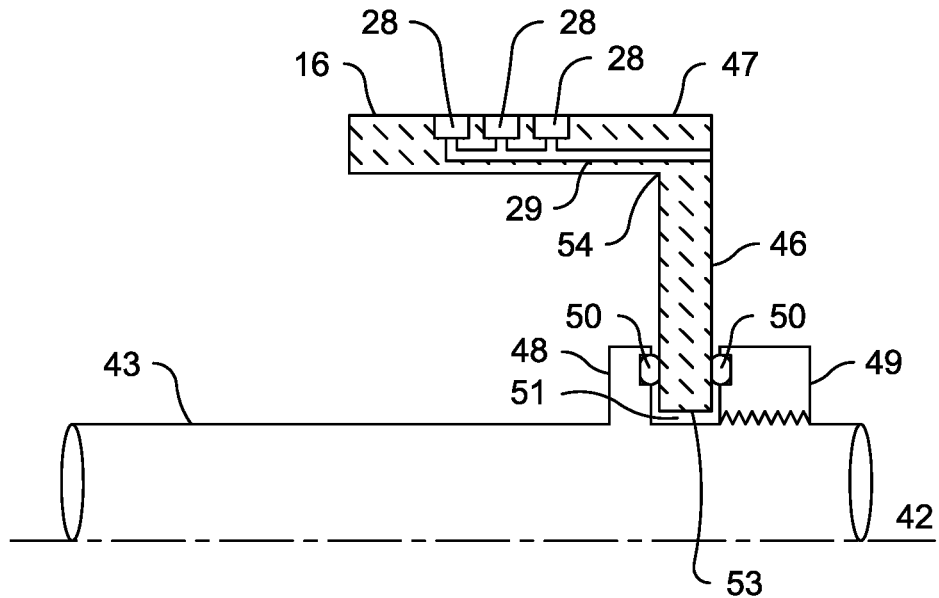
FIG. 19a is a cross-section view illustrating a circumferential sealing assembly as in FIG. 2 wherein a rotatable runner extends from and is secured to a shaft in accordance with other embodiments of the disclosure.
Figure 19B:
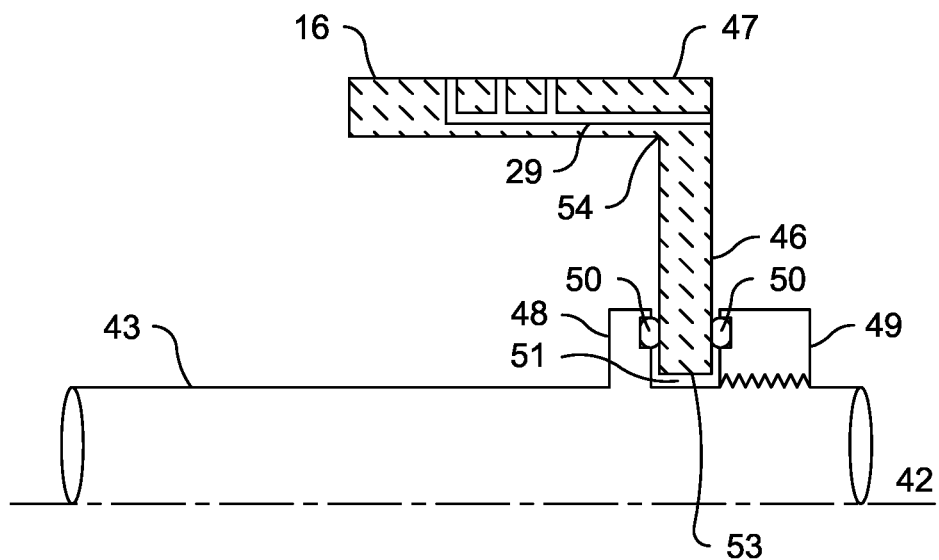
FIG. 19b is a cross-section view illustrating a circumferential sealing assembly as in FIG. 3 wherein a rotatable runner extends from and is secured to a shaft in accordance with other embodiments of the disclosure.
Figure 19C:
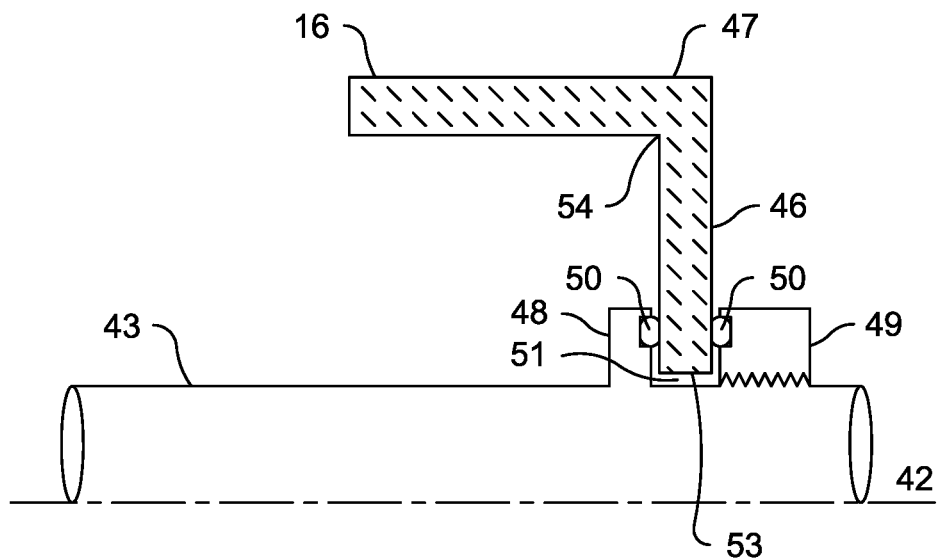
FIG. 19c is a cross-section view illustrating a circumferential sealing assembly as in FIG. 9 wherein a rotatable runner extends from and is secured to a shaft in accordance with other embodiments of the disclosure.
Figure 19D:
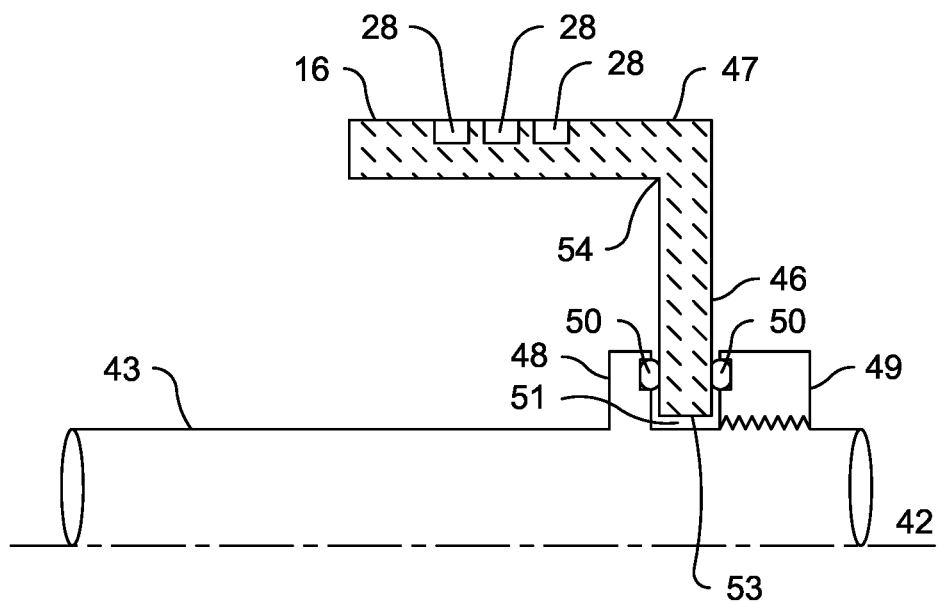
FIG. 19d is a cross-section view illustrating a circumferential sealing assembly as in FIG. 10 wherein a rotatable runner extends from and is secured to a shaft in accordance with other embodiments of the disclosure.
Figure 20A:
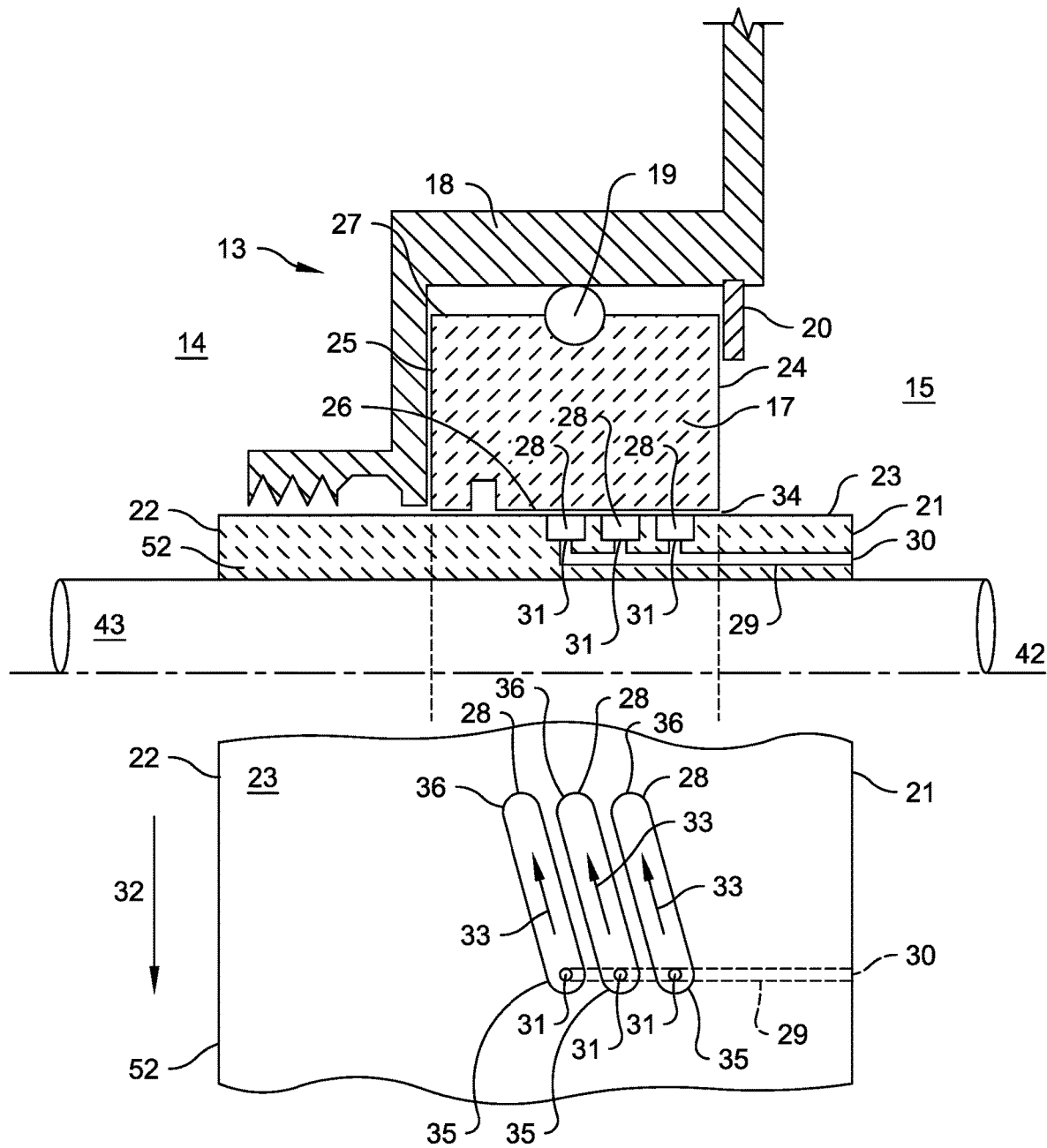
FIG. 20a is a partial cross-section view illustrating a circumferential sealing assembly separating a lower-pressure side and a higher-pressure side wherein grooves are disposed along an outer sealing surface of a sleeve rotatable with a shaft and a gas originating from the higher-pressure side is communicated to the grooves via duct(s) passing through the sleeve in accordance with a fifth embodiment of the disclosure.
Figure 20B:
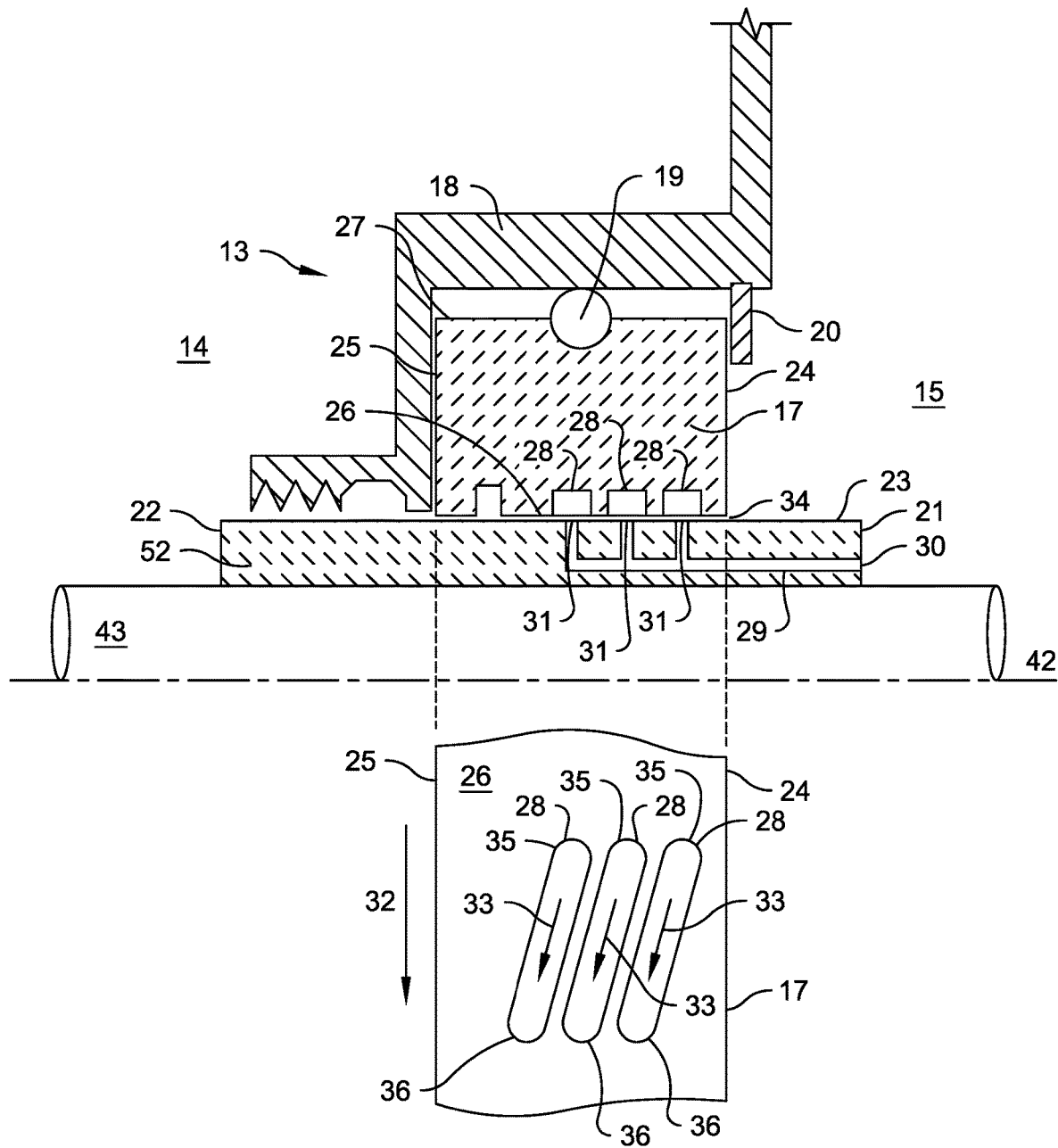
FIG. 20b is a partial cross-section view illustrating a circumferential sealing assembly separating a lower-pressure side and a higher-pressure side wherein grooves are disposed along an inner sealing surface of a sealing ring and a gas originating from the higher-pressure side is communicated into the grooves via duct(s) passing through a sleeve rotatable with a shaft in accordance with a sixth embodiment of the disclosure.
Figure 20C:
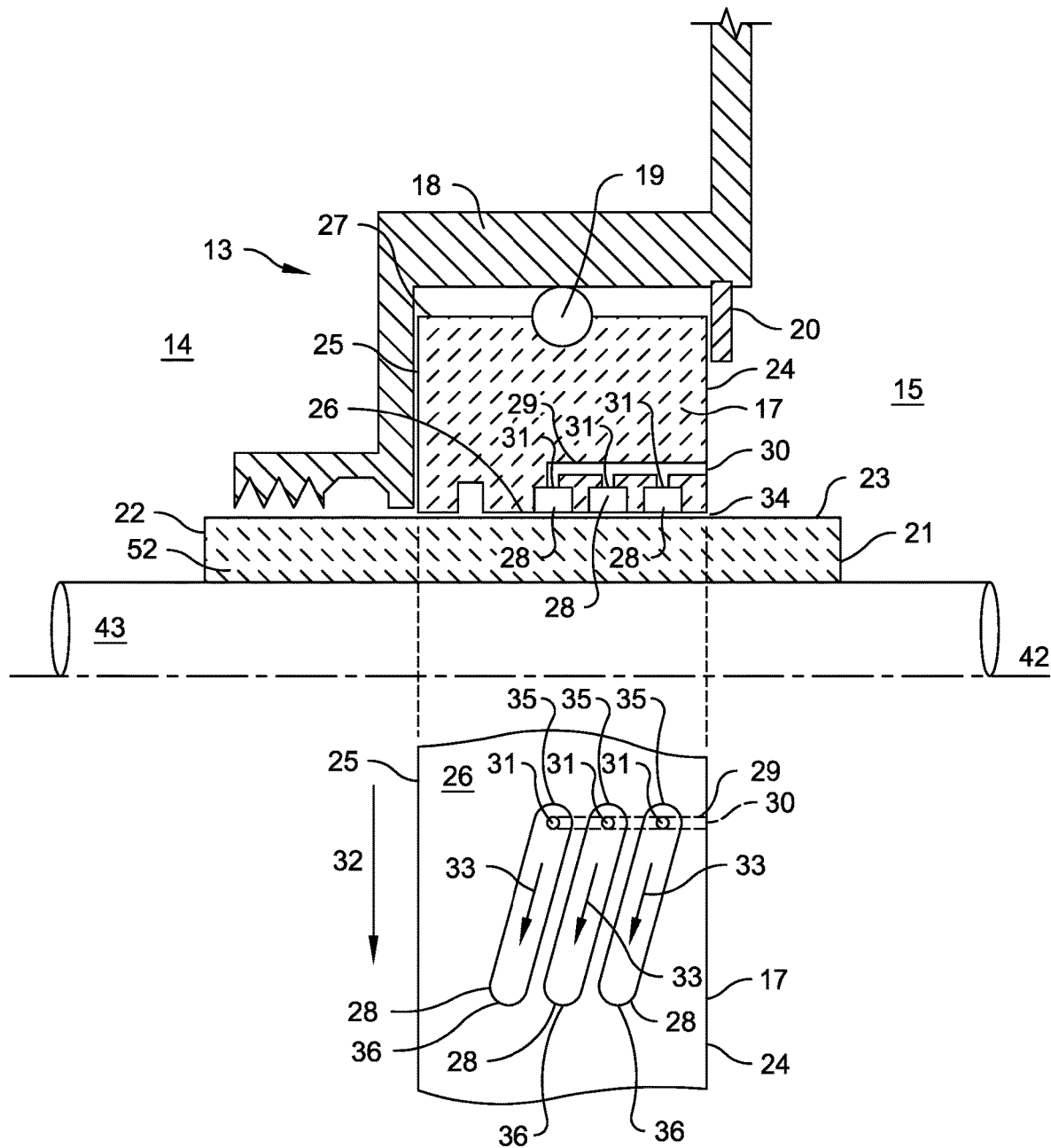
FIG. 20c is a partial cross-section view illustrating a circumferential sealing assembly separating a lower-pressure side and a higher-pressure side wherein grooves are disposed along an inner sealing surface of a sealing ring adjacent to an outer sealing surface of a sleeve rotatable via a shaft and a gas originating from the higher-pressure side is communicated to the grooves via duct(s) passing through the sealing ring in accordance with a seventh embodiment of the disclosure.
Figure 20D:
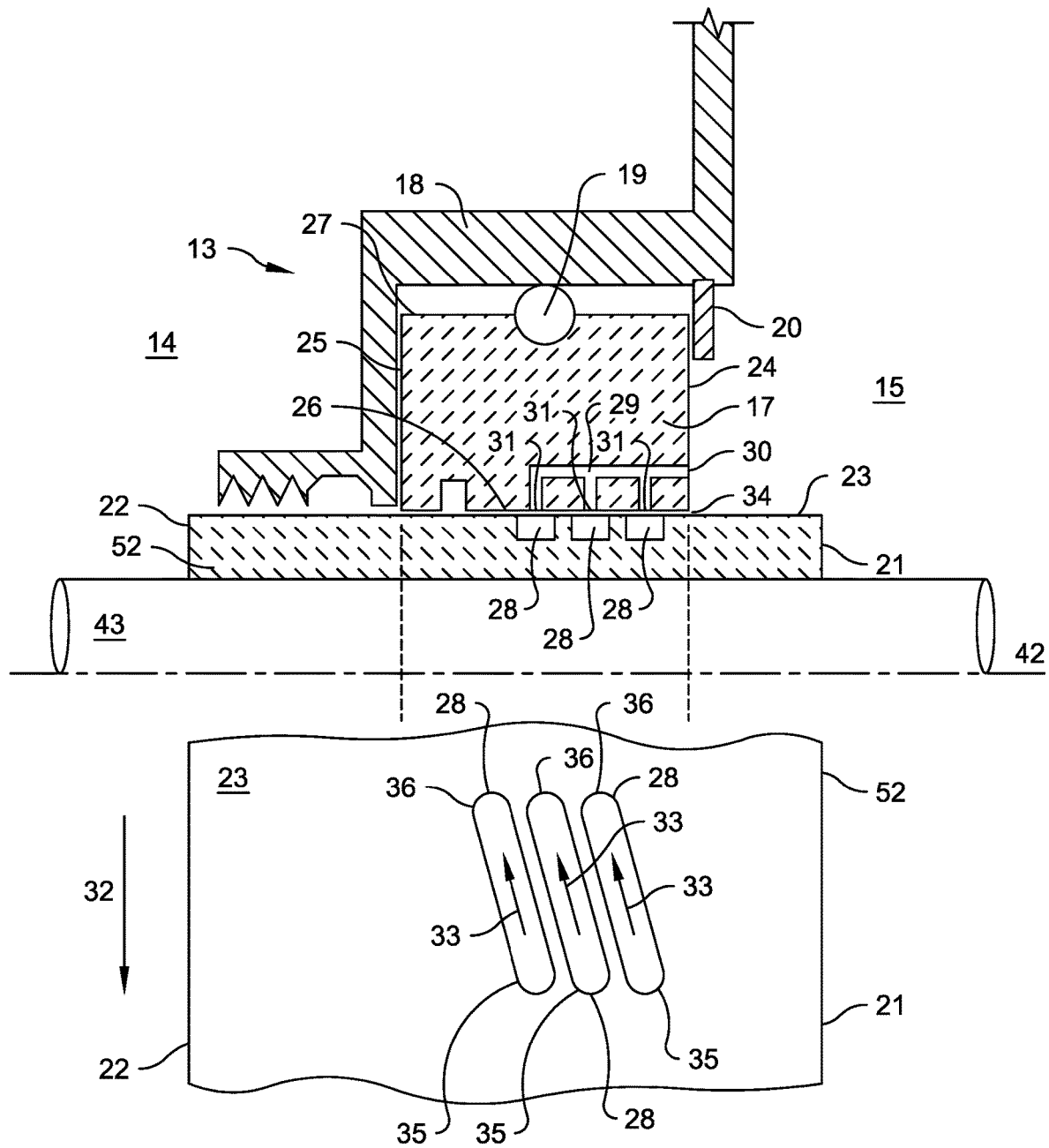
FIG. 20d is a partial cross-section view illustrating a circumferential sealing assembly separating a lower-pressure side and a higher-pressure side wherein grooves are disposed along an outer sealing surface of a sleeve rotatable with a shaft and a gas originating from the higher-pressure side is communicated into the grooves via duct(s) passing through a sealing ring in accordance with an eighth embodiment of the disclosure.

Referring now to FIGS. 14a-14b, a duct 29 may communicate with an outlet 31 disposed within a groove 28 extending into the sealing ring 17 from the inner sealing surface 26 in the direction of the outer surface 27. The ducts 29 may be positioned, sized, shaped, angled, offset, and/or otherwise disposed, arranged, or configured so as to separately pass in the direction of the lower-pressure face 25 and through the sealing ring 17 between the higher-pressure face 24 and the grooves 28. In some embodiments, the inlets 30 may be circumferentially aligned at the higher-pressure face 24; however, other arrangements are possible. In other embodiments, the inlets 30 may be circumferentially aligned within and communicable with a pocket 37 extending into the sealing ring 17 at the higher-pressure face 24.

Referring now to FIG. 15, one or more grooves 28 may be positioned along the outer sealing surface 23 of the rotatable runner 16 or the inner sealing surface 26 of the sealing ring 17. The outlet(s) 31 may be located within or along the groove 28 to optimize sealing or the flow required for sealing. In some embodiments, an outlet 31 may be biased toward the upstream end 35. In other embodiments, an outlet 31 may be biased toward the downstream end 36. In yet other embodiments, an outlet 31 may be equidistant from the upstream end 35 and the downstream end 36.

Referring now to FIGS. 16a-16d, the base 40 of a groove 28 disposed along a rotatable runner 16 or a sealing ring 17 may be configured relative to an opening 41 of the same groove 28 so as to form a non-uniform depth such as illustrated by the non-limiting, non-symmetric example in FIG. 16a, or a uniform depth such as illustrated by the non-limiting examples in FIGS. 16b-16c, or a non-uniform, symmetric example in FIG. 16d. The examples in FIGS. 16a-16b are preferable for unidirectional flow. The examples in FIGS. 16c-16d are preferable for bidirectional flow. In some embodiments, an outlet 31 is fixed along the base 40 (or a side wall) and the outlet 31 directs a hot gas in a flow 38 toward the opening 41 so as to establish a hydrodynamic flow 33 along the groove 28. In other embodiments wherein a hot gas in a flow 38 is directed into the opening 41 to establish a hydrodynamic flow 33, the outlet 31 may move relative to the groove 28 or the groove 28 may move relative to the outlet 31. The relative motion causes the flow 38 to pass along the groove 28 in a circumferential sweep direction 39 so that the flow 38 sweepingly impinges the groove 28. The end result is a flow 38 that dynamically interacts with the groove 28 allowing at least a portion of the flow 38 to enter the groove 28. The sweeping impingement between the flow 38 and a groove 28 may result in a hydrodynamic flow 33 along the groove 28 even though the groove 28 does not move. In cases where a groove 28 does move, the sweeping impingement may enhance the hydrodynamic flow 33 within the groove 28. In yet other embodiments, the duct 29 may be oriented or angled with respect to the base 40 or the opening 41 so that the flow 38 exiting the outlet 31 is perpendicular to the base 40 or the opening 41 or so that the flow 38 exiting the outlet 31 is angled with respect to the base 40 or the opening 41. An angled flow 38 may direct the gas with respect to a groove 28 so as to cause the hydrodynamic flow 33 or to enhance the hydrodynamic flow 33.

Referring again to FIGS. 16a-16d, the hydrodynamic flow 33 is redirected out of the groove 28 at a location along a groove 28. In some embodiments, the redirection may occur at and/or adjacent to an end of a groove 28. In other embodiments, the redirection may occur at and/or adjacent to the location where the flow 38 enters the groove 28 whereby the gas enters the groove 28 and then travels radially outward along both side walls of the groove 28 to establish a W-shaped flow pattern wherein an inward flow is disposed between a pair of outward flows. In other embodiments, the redirection may occur at and/or adjacent to the location where the flow 38 enters the groove 28 whereby the gas enters the groove 28 and then travels radially outward along one side wall of the groove 28 to establish a U-shaped flow pattern wherein an inward flow is disposed adjacent to an outward flow.

Referring now to FIG. 17, it may be advantage in some applications for a hot gas at the higher-pressure side 15 to enter a groove 28, along either an outer sealing surface 23 or an inner sealing surface 26, both directly and via a duct 29. In these embodiments, a groove 28 may either intersect a higher-pressure end 21 of a rotatable runner 16 or intersect a higher-pressure face 24 of a sealing ring 17 so that a hot gas within the higher-pressure side 15 directly enters the groove 28. A hot gas may also enter the groove 28 via an outlet 31 within the groove 28, such as in FIGS. 2 and 9 or an outlet 31 adjacent to the groove 28, such as in FIGS. 3 and 10. It may be possible in some embodiments for a hot gas to directly enter a groove 28 when the sealing ring 17 does not completely overlay the grooves 28 along the rotatable runner 16 or the rotatable runner 16 does not completely overlay the grooves 28 along the sealing ring 17. The dual feeds into a groove 28 are adapted so that the hot gas flows into the groove 28 in the direction of the lower-pressure side 14 while avoiding backflow.

Referring now to FIGS. 18a-18d, it may be advantageous in some embodiments for the rotatable runner 16 in FIGS. 2, 3, 9, and 10 to extend as a part of a shaft 43. The rotatable runner 16 is either integral or fixedly joined, one non-limiting example of the latter via welding, to the shaft 43 so that both the rotatable runner 16 and the shaft 43 rotate about a centerline 42 within a turbine engine. In these embodiments, the rotatable runner 16 may comprise a metal, same as or similar to the shaft 43, which otherwise requires cooling via a lubricant spray 45 directed onto the underside of the rotatable runner 16 via a nozzle 44.

Referring again to FIGS. 18a-18d, the rotatable runner 16 may include an axial sleeve 47 disposed about and offset from the shaft 43. The rotatable runner 16 may also include a radial ring 46 fixed at one end to the axial sleeve 47 and fixed at another end to the shaft 43. The arrangements of the grooves 28 and the ducts 29 described herein are situated along the axial sleeve 47 wherein grooves 28 and duct(s) 29 in FIG. 2 are shown along the axial sleeve 47 in FIG. 18a, duct(s) 29 in FIG. 3 are shown along the axial sleeve 47 in FIG. 18b, no grooves 28 and no duct(s) 29 in FIG. 9 are also not shown along the axial sleeve 47 in FIG. 18c, and grooves 28 in FIG. 10 are shown along the axial sleeve 47 in FIG. 18d.

Referring now to FIGS. 19a-19d, it may be advantageous in some embodiments for the rotatable runner 16 in FIGS. 2, 3, 9, and 10 to be secured to a shaft 43. The rotatable runner 16 is mechanically attached to the shaft 43 so that both the rotatable runner 16 and the shaft 43 rotate about a centerline 42. In these embodiments, the rotatable runner 16 may comprise a ceramic so as to eliminate the need for cooling.

Referring again to FIGS. 19a-19d, the rotatable runner 16 may include a radial ring 46 and an axial sleeve 47. The radial ring 46 is circumferentially disposed about the shaft 43 and separated at a first end 53 from the shaft 43 via a gap 51. The axial sleeve 47 is fixed to and extends from the radial ring 46 at a second end 54. The radial ring 46 is positioned at the first end 53 between a stop 48 extending from the shaft 43 and a locking ring 49 securable to the shaft 43. A heat-resistant first gasket 50 may be positioned between the radial ring 46 and the stop 48. A heat-resistant second gasket 50 may be positioned between the radial ring 46 and the locking ring 49. The rotatable runner 16 is secured to the shaft 43 via the clamping engagement at the first end 53 by the stop 48 and the locking ring 49. Other mechanical attachment arrangements are possible.

Referring again to FIGS. 19a-19d, groove 28 and duct 29 arrangements described herein are applicable to the axial sleeve 47 wherein grooves 28 and duct(s) 29 in FIG. 2 are shown along the axial sleeve 47 in FIG. 19a, duct(s) 29 in FIG. 3 are shown along the axial sleeve 47 in FIG. 19b, no grooves 28 and no duct(s) 29 in FIG. 9 are also not shown along the axial sleeve 47 in FIG. 19c, and grooves 28 in FIG. 10 are shown along the axial sleeve 47 in FIG. 19d.

Referring now to FIGS. 20a-20d, the circumferential sealing assembly 13 includes a sleeve 52 circumferentially contacting and rotatable with a shaft 43 about a centerline 42, a sealing ring 17 circumferentially disposed about the sleeve 52, and a housing 18 circumferentially disposed about the sealing ring 17. The sleeve 52, the sealing ring 17, and the housing 18 cooperate to separate a lower-pressure side 14 with a lubricant oil therein from a higher-pressure side 15 with a hot gas therein. In some embodiments, the sleeve 52 may be attached the shaft 43 via a stop and locking ring arrangement or other suitable mechanical means. The sleeve 52 may be composed of a ceramic when attached to the shaft 43 thereby avoiding the need for cooling. In other embodiments, the sleeve 52 may be part of the shaft 43, however, this approach may require the sleeve 52 to be a metal which typically requires cooling. The sealing ring 17 includes two or more arc-shaped segments that form a ring-shaped structure. The segments in the assembled form of the sealing ring 17 may be biased toward the sleeve 52 via an optional garter spring 19 or the like contacting an outer surface 27 of each segment. Adjacent segments are configured to allow expansion and contraction of the sealing ring 17 in response to conditions within a turbine engine. The housing 18 is configured to support the sealing ring 17 as it sealingly engages the sleeve 52. A locking ring 20 may be removably secured to the housing 18 to secure the sealing ring 17 within the housing 18.

The embodiments in FIGS. 20a, 20b, 20c, and 20d are variations of the embodiments described in FIGS. 2, 3, 9, and 10, respectively. The description by way of reference to FIG. 2 is applicable to FIG. 20a with substitution of "rotatable runner 16" by "sleeve 52". The description by way of reference to FIG. 3 is applicable to FIG. 20b with substitution of "rotatable runner 16" by "sleeve 52". The description by way of reference to FIG. 9 is applicable to FIG. 20c with substitution of "rotatable runner 16" by "sleeve 52". The description by way of reference to FIG. 10 is applicable to FIG. 20d with substitution of "rotatable runner 16" by "sleeve 52". Furthermore, the features in FIGS. 4, 5, 6a-6c, 7a-7c, 8a-8b, 11, 12, 13a-13b, 14a-14b, 15, 16a-16d, and 17 are applicable to the embodiments in FIGS. 20a-20d with substitution of "rotatable runner 16" by "sleeve 52".

While the disclosure is susceptible to various modifications and alternative constructions, certain illustrative embodiments are shown in the drawings and are described in detail herein. It should be understood, however, there is no intention to limit the disclosure to the specific embodiments disclosed, but on the contrary, the intention is to cover all modifications, alternative constructions, combinations, and equivalents falling into the spirit and scope of the disclosure.

As is evident from the explanation herein, the disclosure in its various embodiments may be appropriate, but not limited, to applications wherein non-contact sealing is required to separate a pair of compartments in order to avoid compromising the properties of an oil lubricant by a gas at an elevated temperature.

What is claimed is:

1. A circumferential sealing assembly within a turbine engine for separating a lower-pressure side with a lubricant therein and a higher-pressure side with a hot gas therein comprising:

(a) a rotatable runner;
(b) a sealing ring disposed about said rotatable runner; and
(c) a housing disposed about said sealing ring;
wherein,
said rotatable runner comprises an outer sealing surface interposed between a higher-pressure end and a lower-pressure end;
said sealing ring comprises an inner sealing surface interposed between a higher-pressure face and a lower-pressure face;
a plurality of grooves disposed along said outer sealing surface;
a plurality of ducts which communicate with said grooves, each said duct passes through said rotatable runner from an inlet at said higher-pressure end to an outlet at said groove;
said grooves and said ducts rotate with said rotatable runner;
said ducts in use receive said hot gas at said higher-pressure end via said inlets and direct said hot gas into said grooves at said outlets;
said hot gas entering said grooves in use via said ducts in combination with rotation of said grooves with said rotatable runner in use cause said hot gas to form a hydrodynamic flow within said grooves;
said grooves redirect said hot gas in direction of said inner sealing surface to form a thin film between said outer sealing surface and said inner sealing surface;
said thin film resists migration of said lubricant from said lower-pressure side to said higher-pressure side;

said grooves and said ducts avoid backflow of said hot gas to prevent migration of said lubricant to said higher-pressure side.

2. The circumferential sealing assembly of claim 1, wherein said inlets being disposed within a pocket along said higher-pressure end.

3. The circumferential sealing assembly of claim 1, wherein said inlets being circumferentially aligned at said higher-pressure end.

4. The circumferential sealing assembly of claim 1, wherein said inlets being radially aligned at said higher-pressure end.

5. The circumferential sealing assembly of claim 1, wherein said rotatable runner being part of and rotatable with a shaft.

6. The circumferential sealing assembly of claim 5, wherein said rotatable runner comprises a metal, said rotatable runner cooled via a lubricant spray directed onto said rotatable runner.

7. The circumferential sealing assembly of claim 1, wherein said rotatable runner being secured to and rotatable with a shaft.

8. The circumferential sealing assembly of claim 7, wherein said rotatable runner comprises a radial ring and an axial sleeve, said radial ring and said axial sleeve comprises a ceramic, said radial ring disposed about said shaft and separated at a first end from said shaft via a gap, said axial sleeve extends from said radial ring at a second end, said radial ring disposed at said first end between a stop extending outward from said shaft and a locking ring secured to said shaft, a first gasket interposed between said radial ring and said stop, a second gasket interposed between said radial ring and said locking ring.

9. The circumferential sealing assembly of claim 1, wherein said outlet being equidistant between an upstream end and a downstream end of one of said grooves.

10. The circumferential sealing assembly of claim 1, wherein said outlet being biased toward an upstream end of one of said grooves.

11. The circumferential sealing assembly of claim 1, wherein said outlet being biased toward a downstream end of one of said grooves.

12. The circumferential sealing assembly of claim 1, wherein said grooves do not intersect said higher-pressure end and do not intersect said lower-pressure end, said hot gas enters said grooves only via said ducts when said inner sealing surface completely overlays said grooves.

13. The circumferential sealing assembly of claim 1, wherein at least one of said grooves intersects said higher-pressure end, said hot gas directly enters said at least one of said grooves at intersection with said higher-pressure end, said hot gas also enters said at least one of said grooves via one of said ducts.

14. The circumferential sealing assembly of claim 1, wherein said hot gas directly enters at least one of said grooves when said sealing ring does not completely overlay said at least one of said grooves, said hot gas also enters said at least one of said grooves via one of said ducts.

15. A circumferential sealing assembly within a turbine engine for separating a lower-pressure side with a lubricant therein and a higher-pressure side with a hot gas therein comprising:
(a) a sleeve contacting and rotatable with a shaft;
(b) a sealing ring disposed about said sleeve; and
(c) a housing disposed about said sealing ring;
wherein,
said sleeve comprises an outer sealing surface interposed between a higher-pressure end and a lower-pressure end;
said sealing ring comprises an inner sealing surface interposed between a higher-pressure face and a lower-pressure face;
a plurality of grooves disposed along said outer sealing surface;
a plurality of ducts which communicate with said grooves, each said duct passes through said sleeve from an inlet at said higher-pressure end to an outlet at said groove;
said grooves and said ducts rotate with said sleeve;
said ducts in use receive said hot gas at said higher-pressure end via said inlets and direct said hot gas into said grooves at said outlets;
said hot gas entering said grooves in use via said ducts in combination with rotation of said grooves with said sleeve in use cause said hot gas to form a hydrodynamic flow within said grooves;
said grooves redirect said hot gas in direction of said inner sealing surface to form a thin film between said outer sealing surface and said inner sealing surface;
said thin film resists migration of said lubricant from said lower-pressure side to said higher-pressure side;
said grooves and said ducts avoid backflow of said hot gas to prevent migration of said lubricant to said higher-pressure side.

16. The circumferential sealing assembly of claim 15, wherein said sleeve being part of said shaft.

17. The circumferential sealing assembly of claim 15, wherein said sleeve comprises a ceramic.

18. The circumferential sealing assembly of claim 15, wherein said inlets being disposed within a pocket along said higher-pressure end.

19. The circumferential sealing assembly of claim 18, wherein said inlets being circumferentially aligned at said higher-pressure end.

20. The circumferential sealing assembly of claim 18, wherein said inlets being radially aligned at said higher-pressure end.

21. The circumferential sealing assembly of claim 15, wherein said outlet being equidistant between an upstream end and a downstream end of one of said grooves.

22. The circumferential sealing assembly of claim 15, wherein said outlet being biased toward an upstream end of one of said grooves.

23. The circumferential sealing assembly of claim 15, wherein said outlet being biased toward a downstream end of one of said grooves.

24. The circumferential sealing assembly of claim 15, wherein said grooves do not intersect said higher-pressure end and do not intersect said lower-pressure end, said hot gas enters said grooves only via said ducts.

25. The circumferential sealing assembly of claim 15, wherein at least one of said grooves intersects said higher-pressure end, said hot gas enters at least one of said grooves at intersection with said higher-pressure end, said hot gas also enters said grooves via said ducts.

* * * * *